(12) United States Patent
Takeuchi et al.

(10) Patent No.: US 8,144,378 B2
(45) Date of Patent: Mar. 27, 2012

(54) IMAGE PROCESSING DEVICE, IMAGE PROCESSING METHOD, AND COMPUTER PROGRAM PRODUCT

(75) Inventors: Hiroaki Takeuchi, Kanagawa (JP); Satoshi Takano, Tokyo (JP); Ichiroh Katsunoi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 677 days.

(21) Appl. No.: 12/314,650

(22) Filed: Dec. 15, 2008

(65) Prior Publication Data

US 2009/0161174 A1 Jun. 25, 2009

(30) Foreign Application Priority Data

Dec. 19, 2007 (JP) ................................. 2007-327770
Feb. 7, 2008 (JP) ................................. 2008-027911

(51) Int. Cl.
*H04N 1/04* (2006.01)
(52) U.S. Cl. ......... 358/527; 358/534; 358/468; 358/474
(58) Field of Classification Search .................. 358/527, 358/534, 468, 474, 404
See application file for complete search history.

(56) References Cited

U.S. PATENT DOCUMENTS 6,246,487 B1 * 6/2001 Kobayashi et al. .......... 358/1.13
7,123,385 B2 10/2006 Oteki et al.

FOREIGN PATENT DOCUMENTS

| JP | 63-035071 | 2/1988 |
| JP | 10-327315 | 12/1998 |
| JP | 2004-248057 | 9/2004 |
| JP | 3858877 | 9/2006 |

OTHER PUBLICATIONS

Abstract of JP 2005-080215 published Mar. 24, 2005.

* cited by examiner

*Primary Examiner* — Houshang Safaipour
(74) *Attorney, Agent, or Firm* — Harness, Dickey & Pierce, P.L.C.

(57) ABSTRACT

An image processing device includes a unit for reducing original image data of an image scanned by a scanning unit to generate a preview image; a unit for saving/reading a preview image data item of the preview image data in/from a memory; a unit for transferring the preview image data item saved in the memory to a display unit; a unit for inputting information indicating a relationship between a main scanning direction in which the image is scanned and an upper side of the image; and a unit for changing an arrangement order of pixels in the preview image data item such that the main scanning direction extends from a left side to a right side and the sub scanning direction extends from the upper side to a lower side of the preview image, as viewed with the upper side of the preview image at the top.

19 Claims, 22 Drawing Sheets

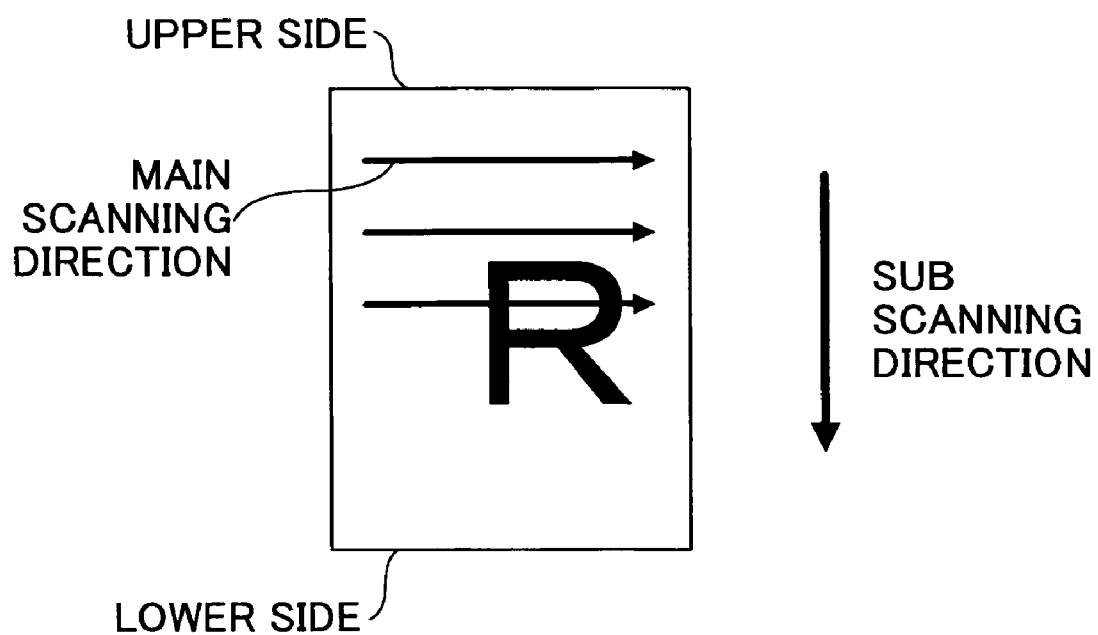

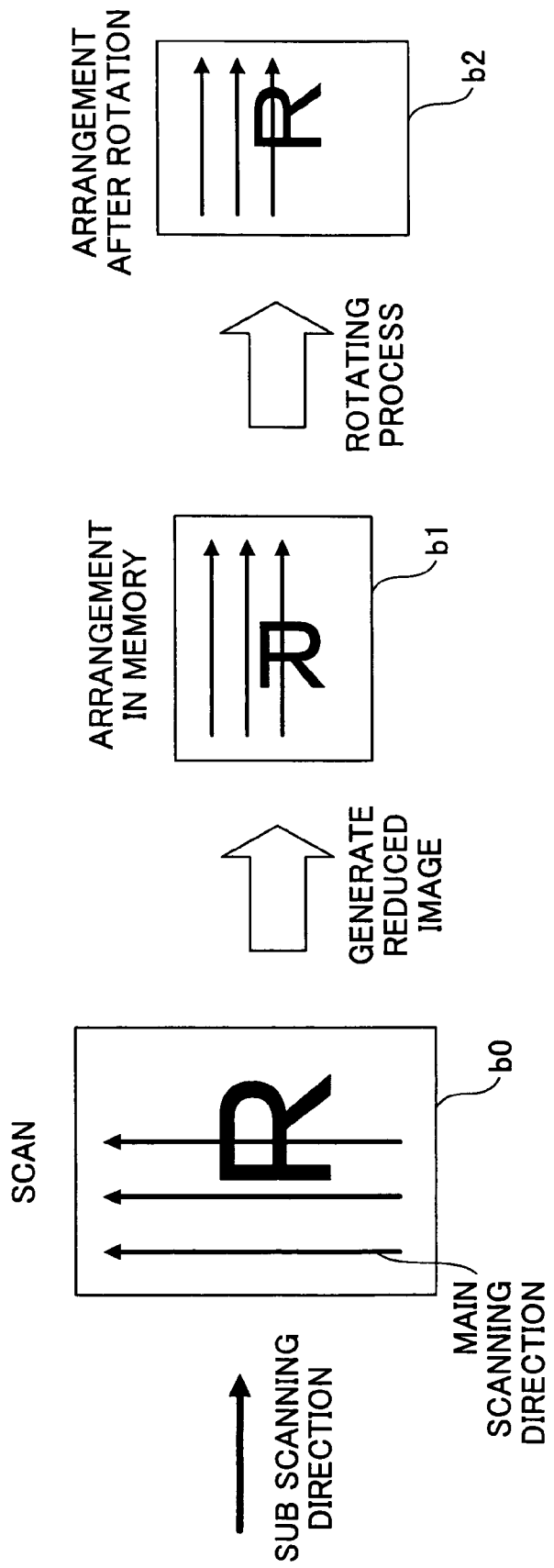

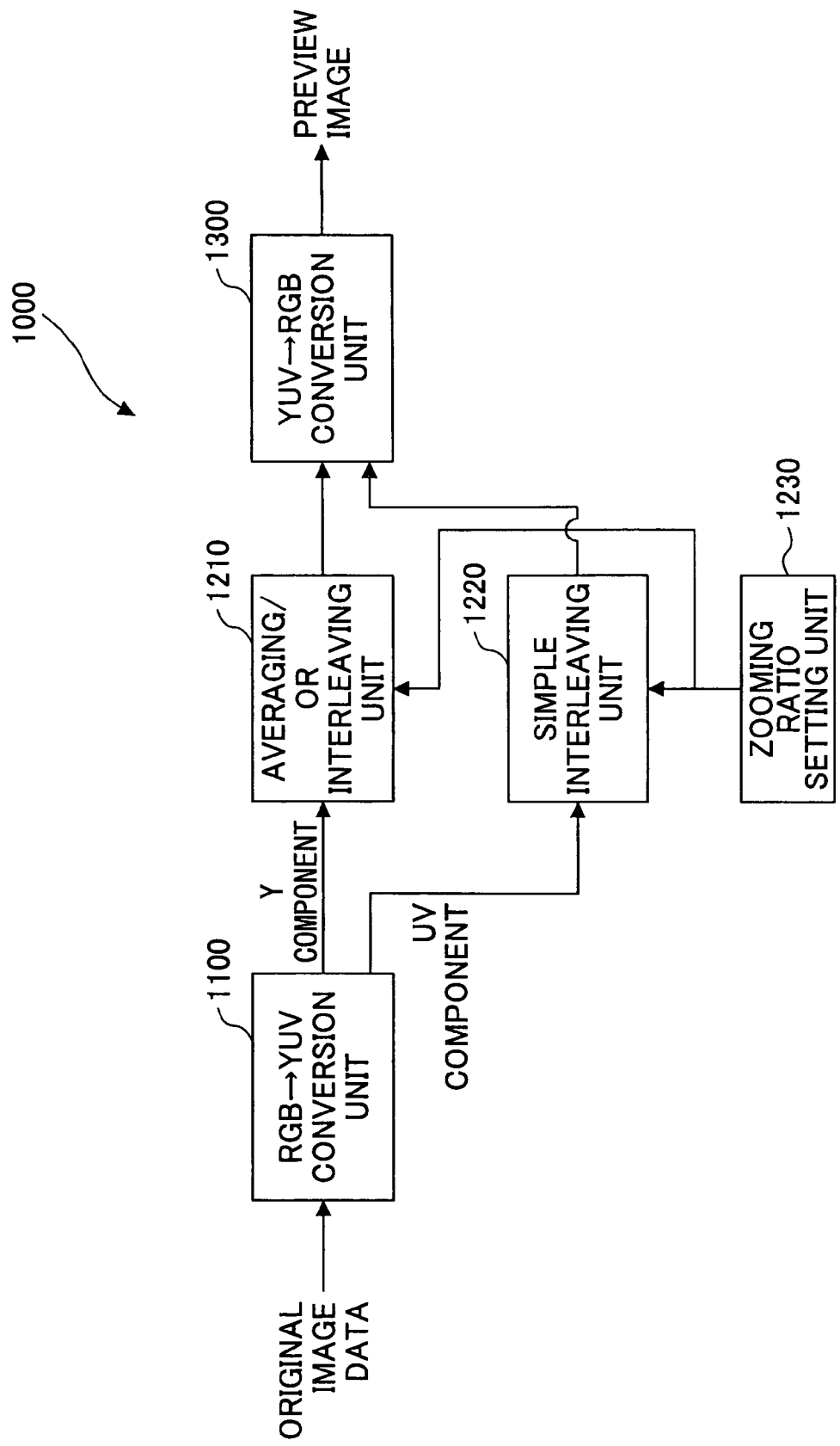

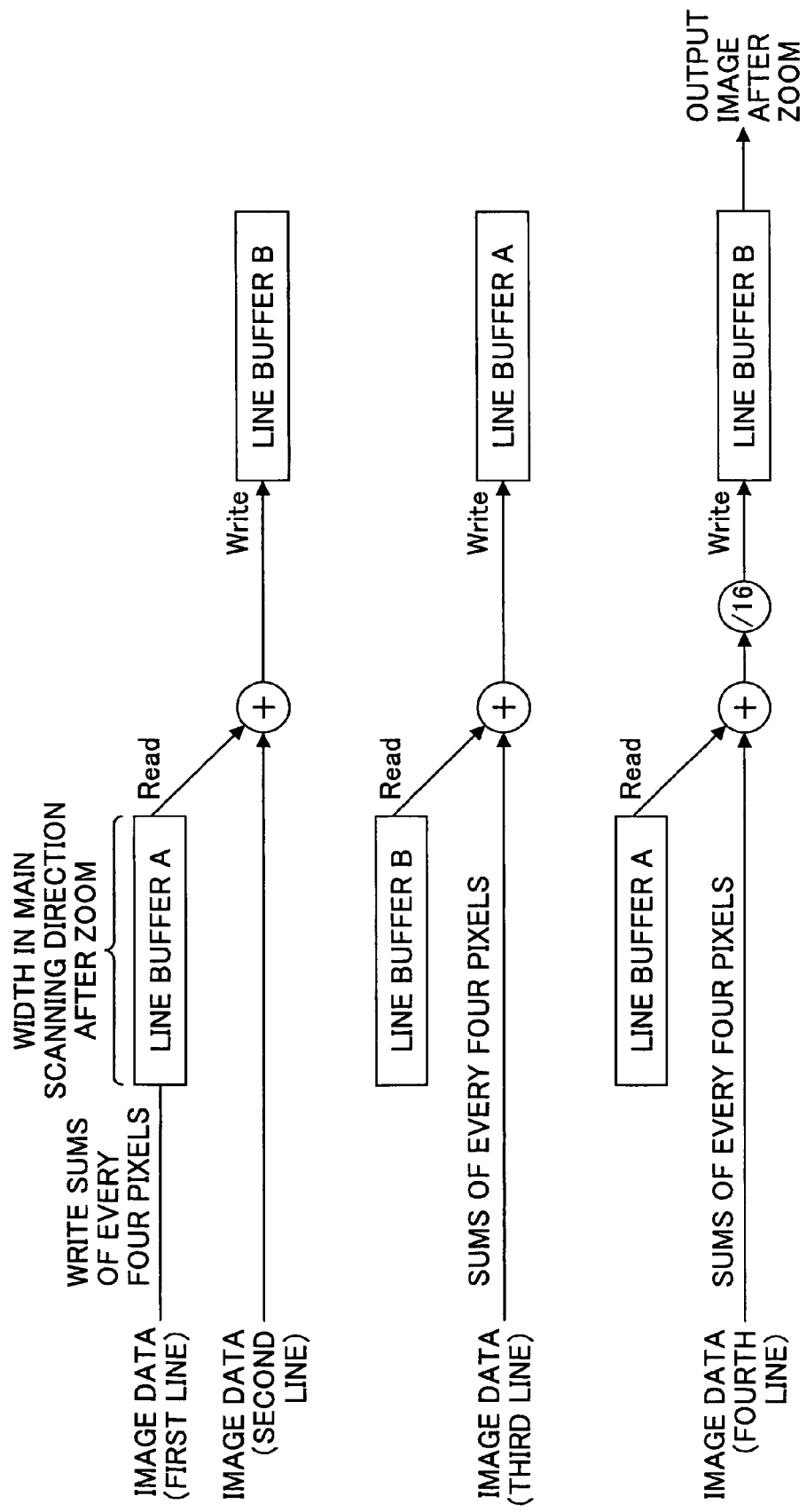

IMAGE PROCESSING DEVICE, IMAGE PROCESSING METHOD, AND COMPUTER PROGRAM PRODUCT

BACKGROUND OF THE INVENTION

1. Field of the Invention

The present invention relates to an image processing device, an image processing method, and a computer program product.

2. Description of the Related Art

Conventionally, an image processing device that processes image data obtained by scanning an image can display a preview of the image that has been scanned or a preview of the image to be processed. For example, Japanese Laid-Open Patent Application No. 2004-248057 (Patent Document 1) discloses an invention of an image forming apparatus with which the operator of the apparatus selects a finished image at a selection page for selecting the finished image, so that the copy mode corresponding to the selection is set.

Patent Document 1: Japanese Laid-Open Patent Application No. 2004-248057

However, the image forming apparatus disclosed in patent document 1 does not address the timings of generating and displaying the finished image which is a preview image. The preview image is generated by performing a zooming process to reduce the input image data, and applying other processes to the reduced image data according to need, such as a rotating process, a modifying process such as a combining process for combining two images together and to outputting them as a single image, a post process such as a punching process or a stapling process, etc. Thus, if reduced image data is generated every time a preview image is displayed, it will take a long time to display the preview image.

Furthermore, the reduction ratio used for reducing the image data varies depending on the operator's purpose of viewing a preview. For example, a rough image suffices for the purpose of confirming the vertical orientation of the image, while a relatively fine image is required for confirming the orientation of the characters included in the image. If reduced image data corresponding to an operator's request is generated every time a request is made by the operator, it takes a considerable length of time to display the preview image. Moreover, the resources of the apparatus will not be efficiently used if similar processes are repeated.

Furthermore, in the process of reducing the image data, if the zooming method were changed depending on the properties of the image, preferable results would be obtained in the reduced image data. For example, the zooming method may be changed depending on whether a region in the image is a character region or a non-character region, and whether the image is a chromatic image or an achromatic image. However, no consideration is made in this respect in patent document 1.

SUMMARY OF THE INVENTION

The present invention provides an image processing device, an image processing method, and a computer program product in which one or more of the above-described disadvantages are eliminated.

A preferred embodiment of the present invention provides an image processing device, an image processing method, and a computer program product capable of generating and quickly displaying preferable preview images according to the purpose of the preview.

According to an aspect of the present invention, there is provided an image processing device including a preview image generating unit configured to reduce original image data of an image scanned by a scanning unit to generate a preview image; a memory control unit configured to save a preview image data item of the preview image in a memory and read the preview image data item from the memory; a transfer unit configured to transfer the preview image data item saved in the memory to a display unit; an information input unit configured to input relationship information indicating a relationship between a main scanning direction in which the image is scanned and an upper side of the image; and an image rotating unit configured to change, with reference to the relationship information, an arrangement order of pixels in the preview image data item in the event that the main scanning direction and a sub scanning direction in which the scanning unit scans the image do not respectively match the main scanning direction and the sub scanning direction in which the display unit displays the preview image with the upper side at the top of the display unit, whereby the arrangement order of the pixels is changed such that the main scanning direction extends from a left side to a right side of the preview image and the sub scanning direction extends from the upper side to a lower side of the preview image, as viewed with the upper side of the preview image at the top.

According to another aspect of the present invention, there is provided an image processing method including a preview image generating step of reducing original image data of an image scanned by a scanning unit to generate a preview image; a saving step of saving a preview image data item of the preview image in a memory; a reading step of reading the preview image data item from the memory; a transfer step of transferring the preview image data item saved in the memory to a display unit; an information input step of inputting relationship information indicating a relationship between a main scanning direction in which the image is scanned and an upper side of the image; and an image rotating step of changing, with reference to the relationship information, an arrangement order of pixels in the preview image data item in the event that the main scanning direction and a sub scanning direction in which the scanning unit scans the image do not respectively match the main scanning direction and the sub scanning direction in which the display unit displays the preview image with the upper side at the top of the display unit, whereby the arrangement order of the pixels is changed such that the main scanning direction extends from a left side to a right side of the preview image and the sub scanning direction extends from the upper side to a lower side of the preview image, as viewed with the upper side of the preview image at the top.

According to one embodiment of the present invention, an image processing device, an image processing method, and a computer program product are provided, which are capable of generating and quickly displaying preferable preview images according to the purpose of the preview.

BRIEF DESCRIPTION OF THE DRAWINGS

Other objects, features and advantages of the present invention will become more apparent from the following detailed description when read in conjunction with the accompanying drawings, in which:

FIG. 1 is for describing the vertical orientation of an image according to an embodiment of the present invention;

FIGS. 2A and 2B illustrate the relationship between the scanned image and the arrangement in the memory;

FIG. 19 illustrates an image processing device configured to perform a different interleaving process for the brightness components and the color-difference components of image data;

FIG. 20 illustrates the averaging interleaving process implemented with the use of two line buffers.

DETAILED DESCRIPTION OF THE PREFERRED EMBODIMENTS

A description is given, with reference to the accompanying drawings, of embodiments of the present invention.

Embodiments of the Present Invention

FIG. 1 is for describing the vertical orientation of an image according to the present embodiment. When the image is arranged in a direction for the user to read or view the image as shown in FIG. 1, the top side is referred to as an "upper side" and the bottom side is referred to as a "lower side". Furthermore, in the present embodiment, the image is scanned by a scanning device and the image is displayed by a displaying device. Among the arrangement directions of pixels that are processed when the image is scanned or displayed, the direction in which a line of continuously-arranged pixels is processed is referred to a "main-scanning direction", and the direction of moving on to the next line after one line has been processed is referred to a "sub scanning direction". In FIG. 1, the main scanning direction is indicated by three thin arrows, and the sub scanning direction is indicated by a thick arrow.

In the example shown in FIG. 1, when a scanning process or a displaying process is performed, one line of pixels is processed at a time from the left to the right in the main scanning direction. When one line of pixels has been processed, the next line in the sub scanning direction is subjected to processing.

(Diagram for Describing Relationship Between Scanned Image and Arrangement in Memory)

Figure 2A:
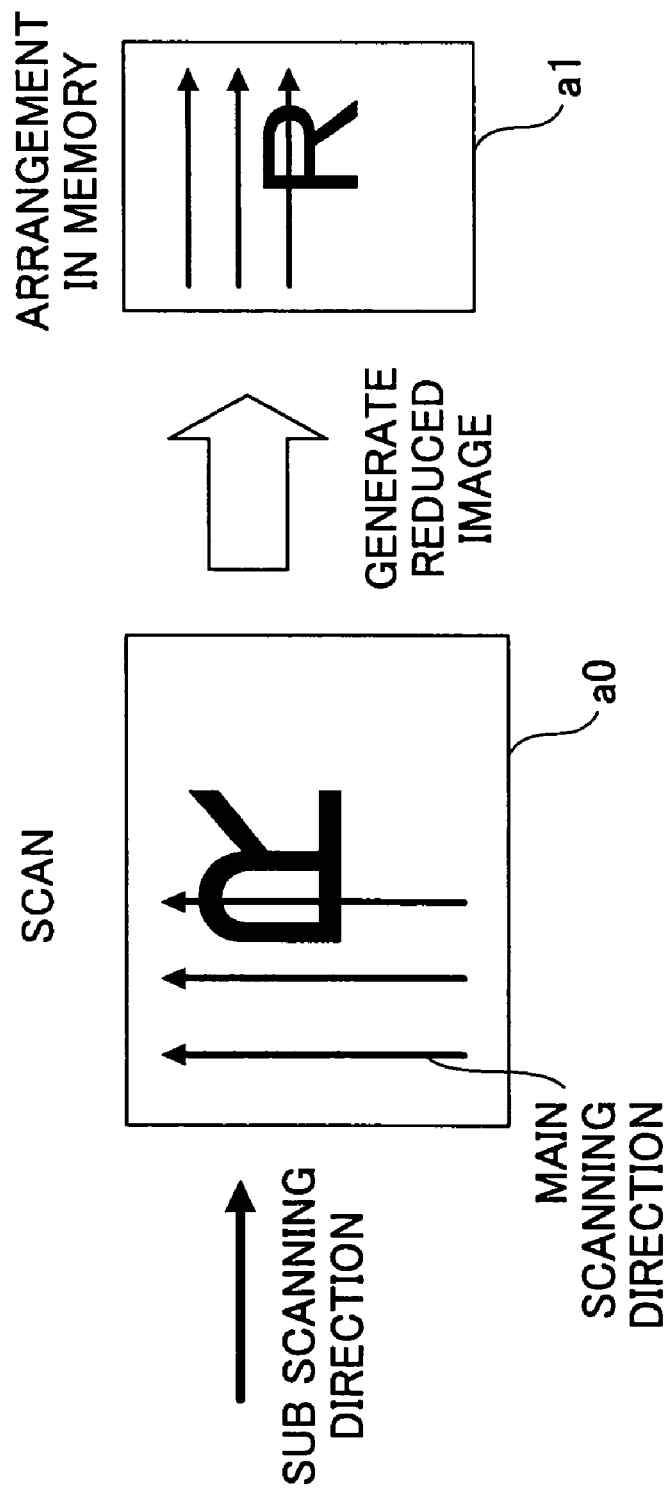

FIGS. 2A and 2B are diagrams for describing the relationship between the scanned image and the arrangement of the image in a memory. In FIGS. 2A and 2B, as a matter of convenience, the arrangement in the memory is illustrated in a two-dimensional manner. However, in practical situations, the image data may be stored in a memory with a one-dimensional address, in which one line of pixels is followed by the next line of pixels.

In each example shown in FIGS. 2A and 2B, a reduced image is generated from the image data which is obtained by scanning an image, in order to generate a preview image of the image. Then, the reduced image is stored in the memory. In the present embodiment, in addition to the reduced image, the image data (hereinafter, "original image data") obtained by scanning the image is also stored in the memory.

FIG. 2A illustrates image data stored in a memory, which is obtained by scanning an image from the upper side of an image. In FIG. 2A, the scanning process is performed from the upper side of the image. Thus, in the acquired original image data a0, lines of pixels extending from the left to the right of the image are aligned from the upper side to the lower side of the image. Accordingly, in a reduced image al obtained from this original image data a0, lines of pixels extending from the left to the right of the image are similarly aligned from the upper side to the lower side of the image.

FIG. 2B illustrates image data stored in a memory, which is obtained by scanning an image in a direction other than from the upper side of the image. In FIG. 2B, for example, the image is scanned in a direction parallel to the vertical orientation of the image. Thus, in the acquired original image data b0, lines of pixels extending from the lower side to the upper side of the image are aligned from the left to the right of the image as viewed with the upper side of the image data situated at the top. Accordingly, in a reduced image b1 obtained by reducing the original image data b0, plural lines of pixels extending from the lower side to the upper side of the image are aligned in a similar manner.

When displaying images, as in the scanning process, pixels in the image data are arranged in a line extending in the main scanning direction, and plural lines are aligned in the sub scanning direction. Thus, if the reduced image b1 is displayed without modification, the upper side of the image will be situated on the right side when displayed on the display device, which makes it difficult for the operator to view. Accordingly, it is necessary to rearrange the pixels in the image data so that the upper side of the image is situated at the top when displayed on the display device, as illustrated with a reduced image b2. This process of rearranging the pixels is the same as rotating the image by 90 degrees in the left (counter-clockwise) direction. Accordingly, in the following embodiments, the "rearranging process" is also referred to as a "rotating process".

(Example of Functional Configuration of Image Processing Device 1 According to Present Embodiment)

Figure 3:
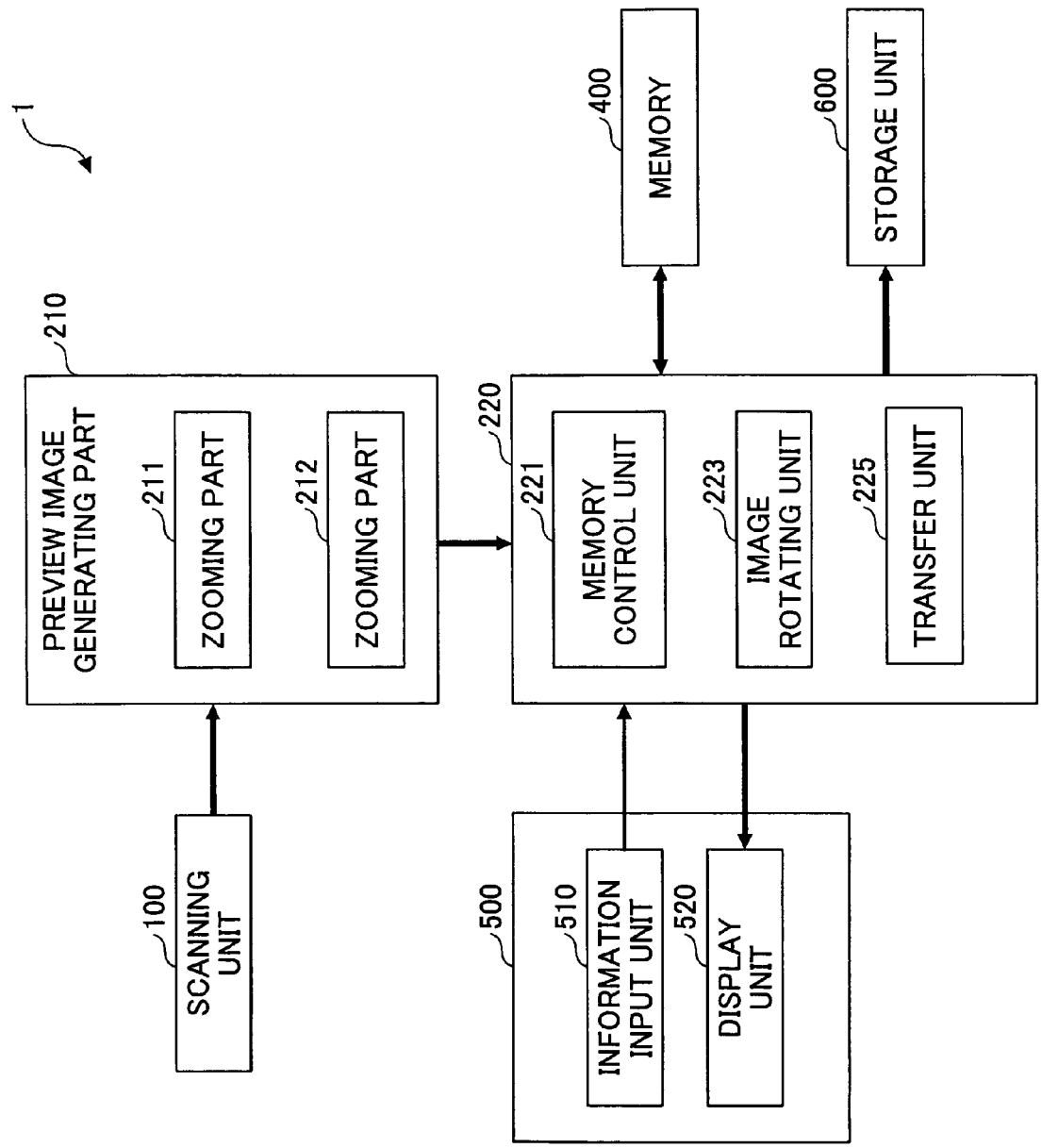
FIG. 3 illustrates a functional configuration of an image processing device according to an embodiment of the present invention.

FIG. 3 illustrates a functional configuration of an image processing device 1 according to the present embodiment. The image processing device 1 shown in FIG. 3 includes, for example, a scanning unit 100, a preview image generating part 210, a control part 220, a memory 400, an operation panel 500, and a storage unit 600.

The scanning unit 100 acquires original image data of an image by scanning the image formed on a medium. The scanning unit 100 is implemented as, for example, a scanner. Furthermore, when scanning an image, the scanning unit 100 can acquire attributes of each region in the image. Attributes of each region are information indicating whether the region is a "character region" or a "non-character region", or whether the region is a "chromatic region" or a monochrome region, i.e., an "achromatic region".

The preview image generating part 210 generates a reduced image by performing a zooming process to reduce the original image data acquired by the scanning unit 100. The preview image generating part 210 can generate a preview image by reflecting, in the reduced image, a modifying process or a post process performed on the original image data.

The preview image generating part 210 includes, for example, zooming parts 211 and 212. Both of the zooming parts 211 and 212 perform a zooming process to reduce the image, but they use different methods. The zooming unit, which performs the zooming process appropriate for each region, is selected based on information pertaining to attributes of the region scanned by the scanning unit 100. More specifically, for example, for a character region, the zooming unit that can prevent the characters from being blotched or being defective is selected. For a color image region, the zooming unit that can provide preferable color balance is selected.

When generating plural preview images with different resolutions, each of the zooming units can generate preview images of different resolutions. For example, one zooming unit can be provided for each resolution level.

The control part 220 can store image data in the memory 400 or the storage unit 600 and perform processes on the image data based on information input from the operation panel 500, and transfer the image to be displayed to the operation panel 500.

The control part 220 includes, for example, a memory control unit 221, an image rotating unit 223, and a transfer unit 225. The memory control unit 221 determines the address for each pixel when storing the original image data and the data of the preview image in the memory 400, and stores the image data in the memory 400.

The image rotating unit 223 performs a rotating process on the image data stored in the memory 400. By performing this rotating process, the lines extending from the left to the right of the image data, as viewed with the upper side of the image data situated at the top, become the main scanning lines, and the direction in which the main scanning lines are aligned becomes the sub scanning line. Accordingly, the order of processing the pixels in a display unit 520 of the operation panel 500 is the same as the order in which the pixels are arranged in the image data.

Other than being provided in the control part 220, the image rotating unit 223 can also be provided in the preview image generating part 210, or can be provided separately from the other units. More specifically, for example, the image rotating unit 223 can be an ASIC in which the image data acquired by the scanning unit 100 is processed.

The transfer unit 225 transfers the image data stored in the memory 400 to the display unit 520 of the operation panel 500, or to the storage unit 600. The transfer unit 225 can be implemented as, for example, a DMA controller. In this case, for example, the transfer unit 225 can be included inside the memory control unit 221 or the image rotating unit 223.

The memory 400 is a storage unit for storing original image data or data of a preview image. The operation panel 500 is a user interface of the image processing device 1 including, for example, an information input unit 510 and the display unit 520.

The information input unit 510 receives input information for instructing execution of a process or setting contents of the process. Furthermore, the information input unit 510 receives input information pertaining to the relationship between the upper side of an image scanned by the scanning unit 100 and the main scanning direction in which the scanning process is performed. Accordingly, the control part 220 can determine whether to perform the rotating process on the data of the preview image of the input image.

More specifically, the rotating process is not performed when the scanning unit 100 starts the scanning process from the upper side of the image. When the scanning unit 100 starts scanning the image from a side other than the upper side of the image, the rotating process is performed. Accordingly, in the image data stored in the memory, the arrangement order of the pixels is changed such that the pixels are arranged in an order starting from the upper side of the image.

The display unit 520 displays the state of the image processing device 1 and a preview image of the image processed by the image processing device 1. The display unit 520 displays the image by arranging the pixels of the image in the main scanning direction one line at a time, which lines are aligned in the sub scanning direction.

In the present embodiment, preview images are displayed on the display unit 520 of the image processing device 1. However, embodiments of the present invention are not limited thereto. Preview images can be displayed on a display unit which is controlled by a personal computer connected to the image processing device 1.

The storage unit 600 is for storing original image data and data of a preview image. Once the data is stored, the storage unit 600 can hold this data until it is deleted, whether or not the power is turned off, like hard disk devices. Furthermore, the storage unit 600 can store high-volume data.

(Example of Image Control Device)

Figure 4:
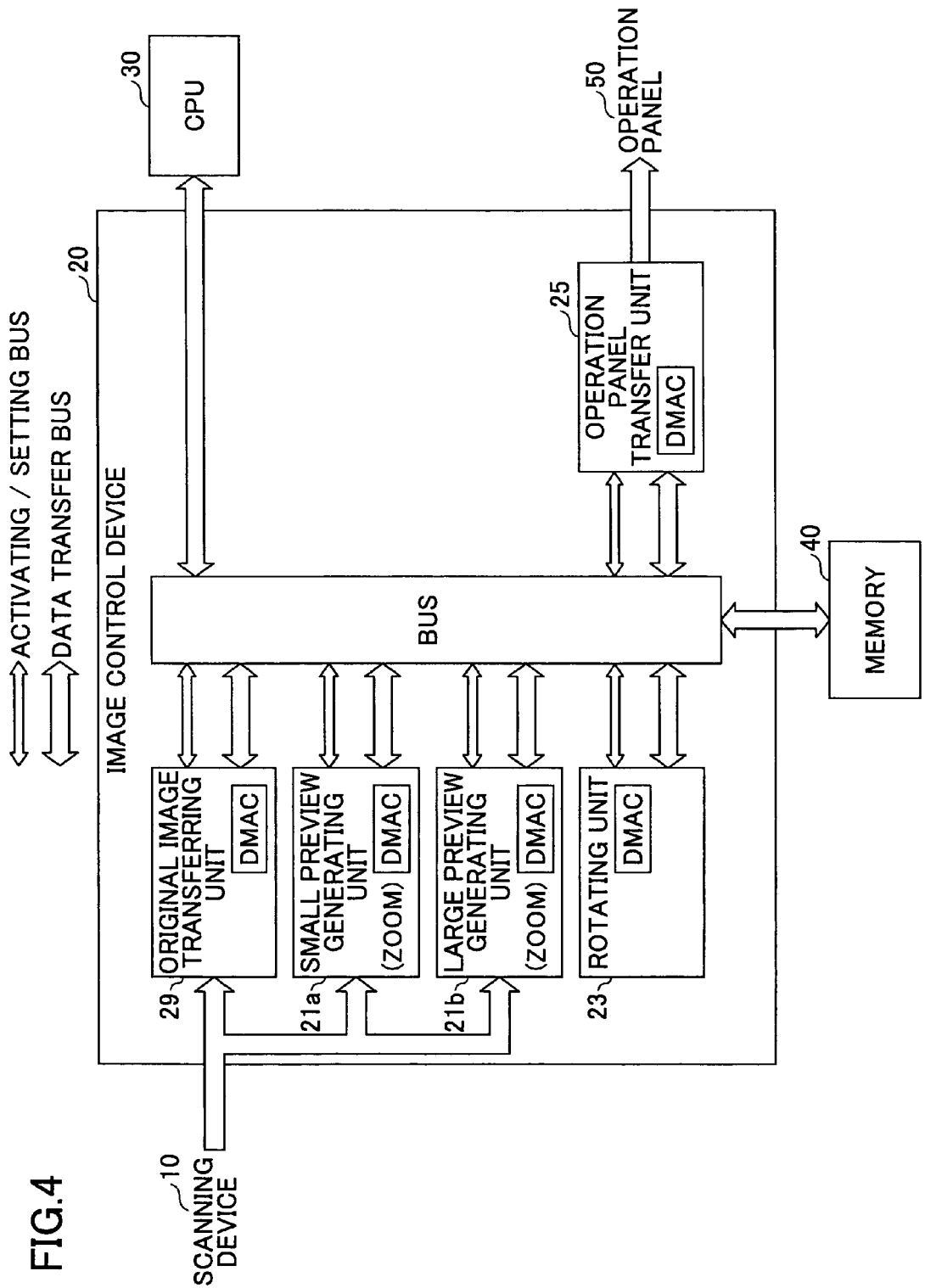
FIG. 4 illustrates the configuration of an image control device.

FIG. 4 illustrates the configuration of an image control device 20 for processing image data acquired by a scanning device 10. The image control device 20 corresponds to, for example, the preview image generating part 210 and the control part 220 shown in FIG. 3.

The image control device 20 is connected to the scanning device 10, a CPU 30, a memory 40, and an operation panel 50, via a bus. The image control device 20 includes, for example, an original image transferring unit 29, a small preview generating unit 21a, a large preview generating unit 21b, a rotating unit 23, and an operation panel transfer unit 25. These units are connected to each other via a data transfer bus and an activating/setting bus. The data transfer bus is for transferring image data, and the activating/setting bus is for transferring commands. Each unit includes a DMA controller. Accordingly, with the use of the data transfer bus, DMA transfer operations can be performed while processing the image data.

The original image transferring unit 29 directly outputs the input original image data. Each of the small preview generating unit 21a and the large preview generating unit 21b generates a preview image based on the input original image data. The preview image generated by the small preview generating unit 21*a* has lower resolution compared to that generated by the large preview generating unit 21*b*.

The preview images generated by the small preview generating unit 21*a* are provided for confirming the orientation of the image and the positions where post processes are to be performed. These preview images are suitable for images having large non-character regions such as pictures, diagrams and photographs. The preview images generated by the large preview generating unit 21*b* are suitable for images with large character regions.

In the following embodiments, the preview image generated by the small preview generating unit 21*a* is referred to as a "small preview" and the preview image generated by the large preview generating unit 21*b* is referred to as a "large preview".

The rotating unit 23 performs a rotating process on the image data. The operation panel transfer unit 25 transfers the image data in the memory to the operation panel 50 to display the image.

The memory 40 stores image data to be stored by the image control device 20, and the operation panel 50 is used for displaying the preview image and inputting instructions.

The CPU 30 controls the image control device 20 by the following procedures.

(1) Specify pertinent settings and activate each of the DMA controllers provided in the original image transferring unit 29, the small preview generating unit 21*a*, and the large preview generating unit 21*b*.

(2) Output an instruction to the scanning device 10 to transfer the original image data.

(3) Execute the transfer operation of the original image data.

(4) When the transfer operation of the original image data ends, a completion notice is output from each of the DMA controllers provided in the original image transferring unit 29, the small preview generating unit 21*a*, and the large preview generating unit 21*b*, to the CPU 30.

(5) The CPU 30 specifies pertinent settings and activates the DMA controller provided in the rotating unit 23.

(6) The rotating unit 23 performs a rotating process on the image data. This process is realized by storing the image data stored in the memory 40 in another region of the memory 40, while changing the order in which the pixels are arranged in this image data.

(7) When the rotating process ends, a completion notice is output from the DMA controller provided in the rotating unit 23 to the CPU 30.

(8) The CPU 30 specifies pertinent settings and activates the DMA controller provided in the operation panel transfer unit 25.

(9) The operation panel transfer unit 25 transfers the data of the preview image stored in the memory 40 to the operation panel 50.

(10) When the data is transferred to the operation panel 50, a completion notice is output from the DMA controller provided in the operation panel transfer unit 25 to the CPU 30.

(Example of Process for Generating and Displaying Preview Image)

FIGS. 5 through 11 illustrate the process of generating and displaying the preview image. In the examples shown in FIGS. 5 through 11, the preview image is displayed on the operation panel 50. However, embodiments of the present invention are not limited thereto. The preview image can be displayed on a display unit connected via a network. In such a case, the data of the preview image is to be transferred by a communication operation performed via the network, instead of being transferred to the operation panel 50 by a DMA transfer operation.

(Case of Scanning Image from Upper Side)

Figure 5:
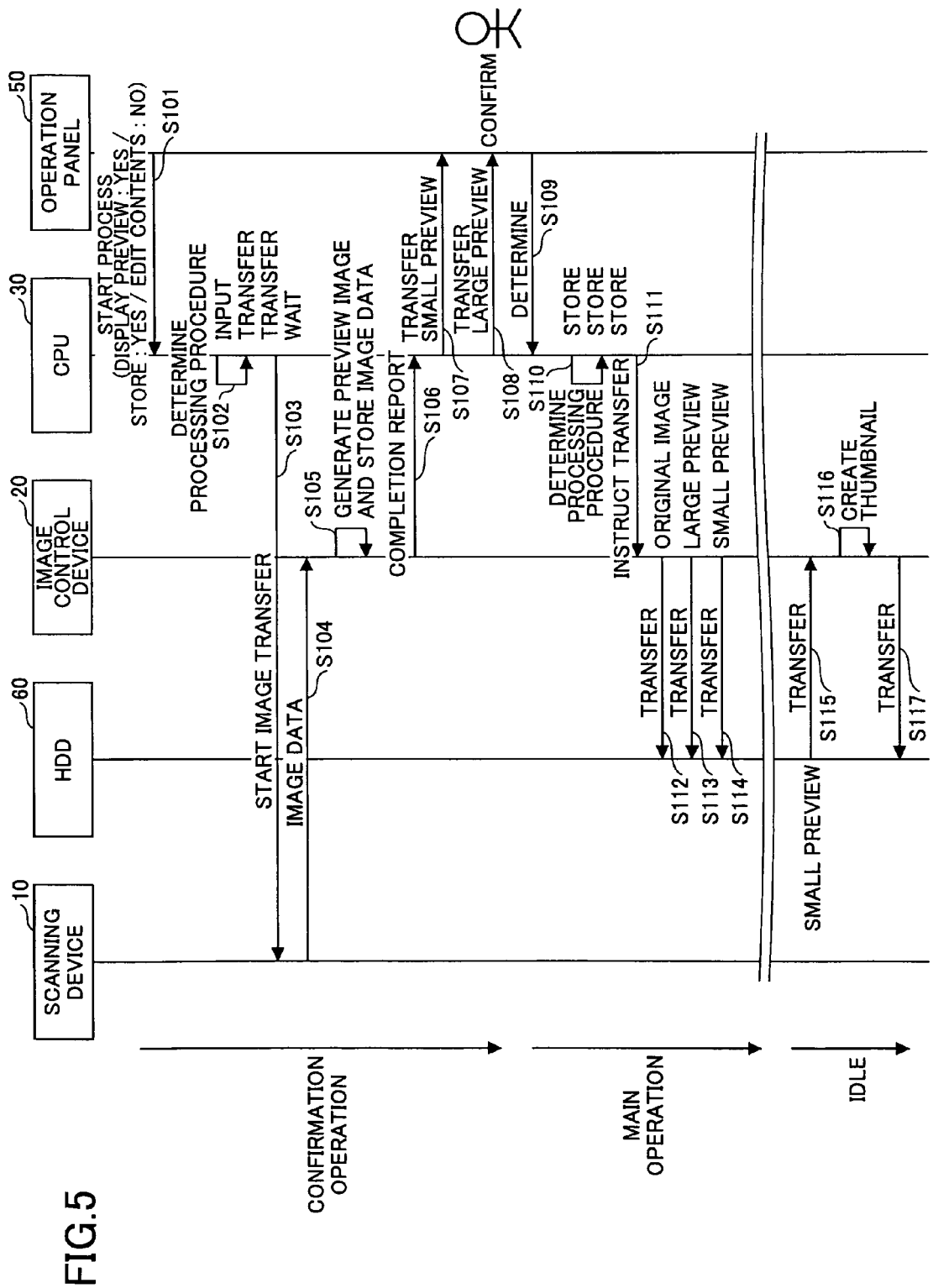
FIG. 5 is a sequence diagram of a process when the image is scanned from the upper side of the image.

FIG. 5 is a sequence diagram of a process for generating a preview image when the scanning device 10 scans an image starting from the upper side of the image.

At step S101 of FIG. 5, the operation panel 50 outputs, to the CPU 30, a request to start the process. This request includes the contents of the process. The contents of the process are, for example, to scan the image from the upper side, display a preview, store the image data in a HDD 60 (corresponding to the storage unit 600, for example), indicate that no editing processes such as a combining process are performed, etc.

Step S102 is performed after step S101. The CPU 30 determines the processing procedures based on the process contents. In this example, it is determined that the processes are to be executed in the order of inputting the image and generating the preview images, transferring a small preview to the operation panel 50, and transferring a large preview to the operation panel 50.

Step S103 is performed after step S102. The CPU 30 outputs, to the scanning device 10, a request to start transferring the original image data. Step S104 is performed after step S103. In accordance with the request, the scanning device 10 outputs, to the image control device 20, the original image data of the image scanned by the scanning device 10.

Step S105 is performed after step S104. The image control device 20 stores the original image data in the memory 40, and generates preview images. In this case, two preview images having different resolution levels are generated, i.e., the small preview and the large preview. The data of the two preview images is stored in the memory 40. Step S106 is performed after step S105. The image control device 20 outputs, to the CPU 30, a notice reporting that the preview images have been generated and the image data has been stored in the memory 40.

Step S107 is performed after step S106. The image data of the small preview generated at step S105 is transferred to the operation panel 50. Accordingly, an image of the small preview is displayed on the display unit of the operation panel 50. Step S108 is performed after step S107. The image data of the large preview generated at step S105 is transferred to the operation panel 50. Accordingly, an image of the large preview is displayed on the display unit of the operation panel 50.

In the example of FIG. 5, the process of transferring the data to the operation panel 50 is first performed for the small preview and is then performed for the large preview. The large preview requires more processing time compared to the small preview. Thus, by performing the process for the large preview after that for the small preview, it is possible to reduce the time required to display the first preview image on the operation panel 50.

In the processes of step S109 onward, it is assumed that the operator has determined to execute of a process corresponding to the preview image displayed at step S107 or S108, and has input pertinent instructions.

At step S109, the operation panel 50 outputs, to the CPU 30, a notice reporting that it has been determined to execute the process corresponding to the preview image. Step S110 is performed after step S109. Based on the notice received at step S109, the CPU 30 determines the processing procedures. In this example, it is determined that three image data items of the original image data, the large preview, and the small preview, are to be stored in the HDD 60 in this order.

Step S111 is performed after step S110. The CPU 30 outputs, to the image control device 20, an instruction to transfer the image data. At steps S112 through S114, in accordance with the instruction received at step S111, image data of the original image data, the large preview, and the small preview is transferred from the image control device 20 to the HDD 60, and is stored in the HDD 60. The process of steps S112 through S114 can be executed in any order.

Step S115 is performed after steps S112 through S114. The processes from step S115 onward are preferably executed during an "idle" time while no other jobs are being performed. At step S115, the HDD 60 transfers, to the image control device 20, the image data of the small preview. Step S116 is performed after step S115. The image control device 20 generates image data of a thumbnail, which is obtained by further reducing the small preview. Step S117 is performed after step S116. The image control device 20 outputs, to the HDD 60, the image data of the thumbnail.

The thumbnail is a reduced image used for displaying a list of image data items stored in the HDD 60. The thumbnail has an even lower level of resolution than that of a small preview. In the process illustrated in FIG. 5, the image data of the small preview is read from the HDD 60 before generating the thumbnail. However, when the image data of the small preview is stored in the memory 40, the image data in the memory 40 can be used instead of performing the process of reading image data from the HDD 60.

(Case of Scanning Image in Direction Other than from Upper Side of Image)

Figure 6:
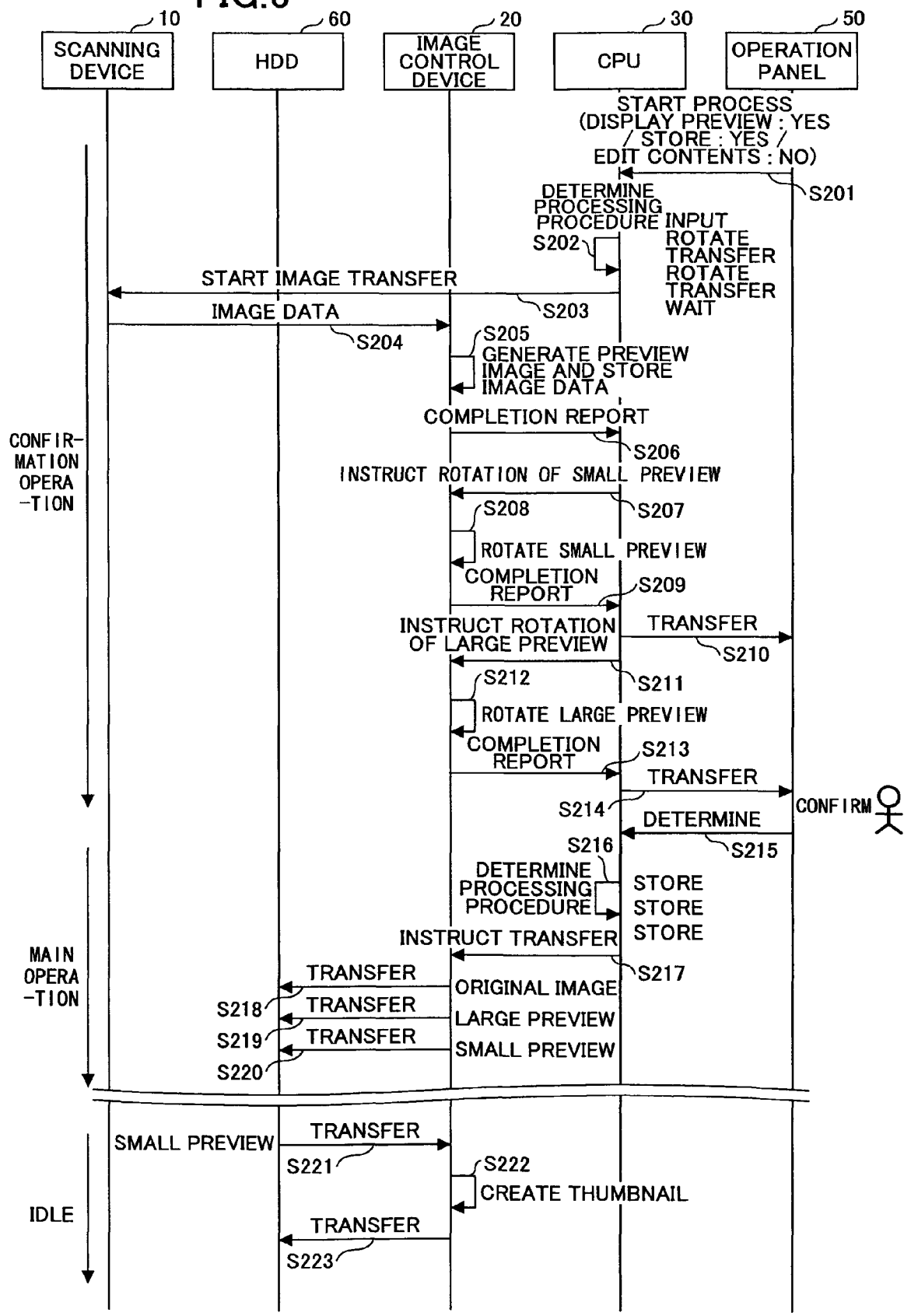
FIG. 6 is a sequence diagram of a process when the image is scanned in a direction other than from the upper side of the image.

FIG. 6 is a sequence diagram of a process for generating a preview image when the scanning device 10 scans an image in a direction other than from the upper side of the image.

In step S201 of FIG. 6, the operation panel 50 outputs, to the CPU 30, a request to start a process. This request includes the contents of the process. The contents of the process are, for example, to scan the image in a direction other than from the upper side of the image, display a preview, store the image data in the HDD 60, indicate that no editing processes such as a combining process are performed, etc.

Step S202 is performed after step S201. The CPU 30 determines the processing procedures based on the process contents. In this example, it is determined that the processes are to be executed in the order of inputting the image and generating the preview images, performing a rotating process on a small preview and transferring the small preview to the operation panel 50, and performing a rotating process on a large preview and transferring the large preview to the operation panel 50.

Step S203 is performed after step S202. The CPU 30 outputs, to the scanning device 10, a request to start transferring the original image data. Step S204 is performed after step S203. In accordance with the request, the scanning device 10 outputs, to the image control device 20, the original image data of the image scanned by the scanning device 10.

Step S205 is performed after step S204. The image control device 20 stores the original image data in the memory 40, and generates preview images. In this case, two preview images having different resolution levels are generated, i.e., the small preview and the large preview. The data of the two preview images is stored in the memory 40. Step S206 is performed after step S205. The image control device 20 outputs, to the CPU 30, a notice reporting that the preview images have been generated and the image data has been stored in the memory 40.

Step S207 is performed after step S206. The CPU 30 outputs, to the image control device 20, an instruction to rotate the small preview. Step S208 is performed after step S207.

The image control device 20 performs a rotating process on the image data of the small preview. This process is performed by a DMA transfer operation which is executed by reading the image data of the small preview stored in the memory 40, and storing this image data in another region in the memory 40. Step S209 is performed after step S208. The image control device 20 outputs, to the CPU 30, a notice reporting that the rotating process has ended.

Step S210 is performed after step S209. The image data of the small preview rotated at step S208 is transferred to the operation panel 50. Accordingly, an image of the small preview is displayed on the display unit of the operation panel 50.

The processes of steps S211 through S214 performed after step S210 correspond to a rotating process performed on the image data of the large preview and a transfer process of transferring the image data to the operation panel 50, which are the same as the processes of steps S207 through S210 pertaining to the small preview, and are thus not further described. Furthermore, the processes of steps S215 through S223 are the same as the processes of steps S109 through S117 of FIG. 5, and are thus not further described.

In the example of FIG. 6, the rotating process and the process of transferring the data to the operation panel 50 are first performed for the small preview and are then performed for the large preview. The large preview requires more processing time compared to the small preview. Thus, by performing these processes for the large preview after those for the small preview, it is possible to reduce the time required to display the first preview image on the operation panel 50.

(Example of Copy Process)

Figure 7:
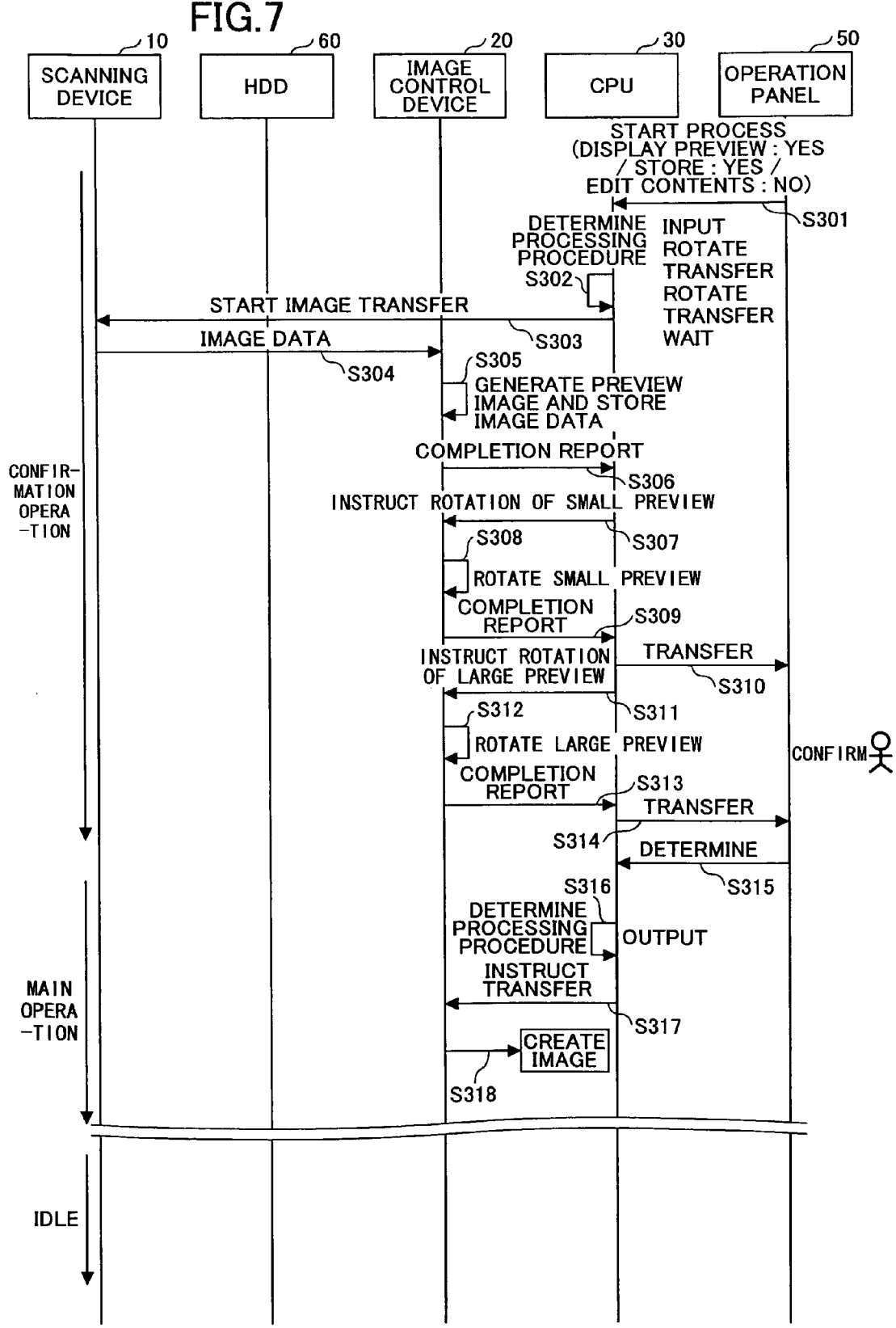
FIG. 7 is a sequence diagram for describing a process of outputting the image data without storing it.

In the processes of FIGS. 5 and 6, the image data is stored in the HDD 60. However, FIG. 7 is a sequence diagram for describing a process for outputting the image data without storing it in the HDD 60. An example of a process of outputting the image without storing it in the HDD 60 is a copy process.

In step S301 of FIG. 7, the operation panel 50 outputs, to the CPU 30, a request to start a process. This request includes the contents of the process. The contents of the process are, for example, to scan the image in a direction other than from the upper side of the image, display a preview, not to store the image data in the HDD 60, indicate that no editing processes such as a combining process are performed, etc.

The processes of steps S302 through S314 performed after step S301 are the same as the processes of steps S202 through S214 of FIG. 6, and are thus not further described.

Step S315 is performed after step S314. The operation panel 50 outputs, to the CPU 30, a notice reporting that it has been determined to execute the process corresponding to the displayed preview image. Step S316 is performed after step S315. The CPU 30 determines the processing procedures. In this example, it is determined that the image data is to be output.

Step S317 is performed after step S316. The CPU 30 outputs, to the image control device 20, a notice to transfer the original image data. Step S318 is performed after step S317. The image control device 20 transfers the original image data to an image output device (not shown), thereby performing the output process.

(Example of Scanning Image from Upper Side and Combining Images)

Figure 8:
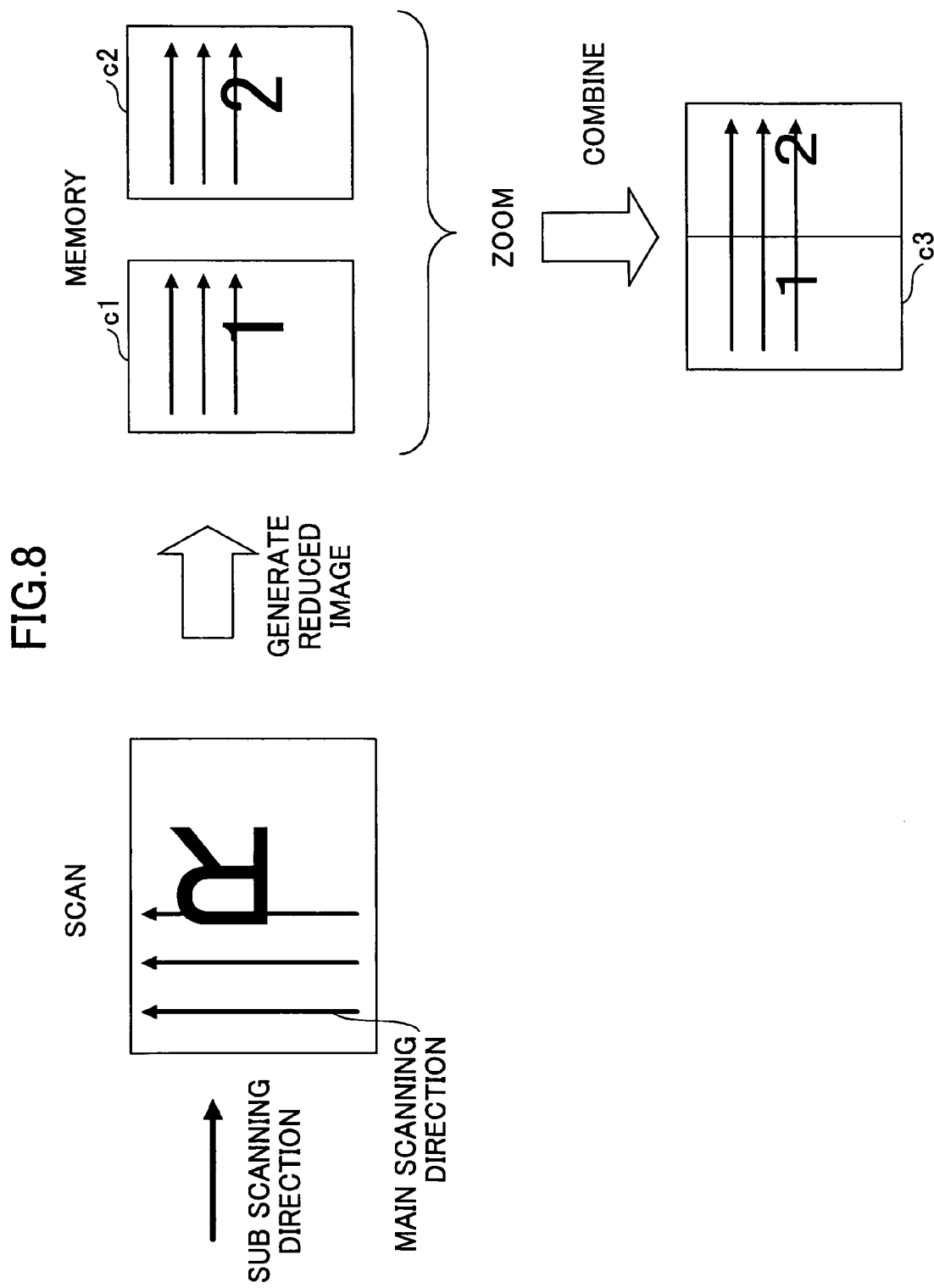
FIG. 8 illustrates an example of scanning an image from the top and combining images.
Figure 9:
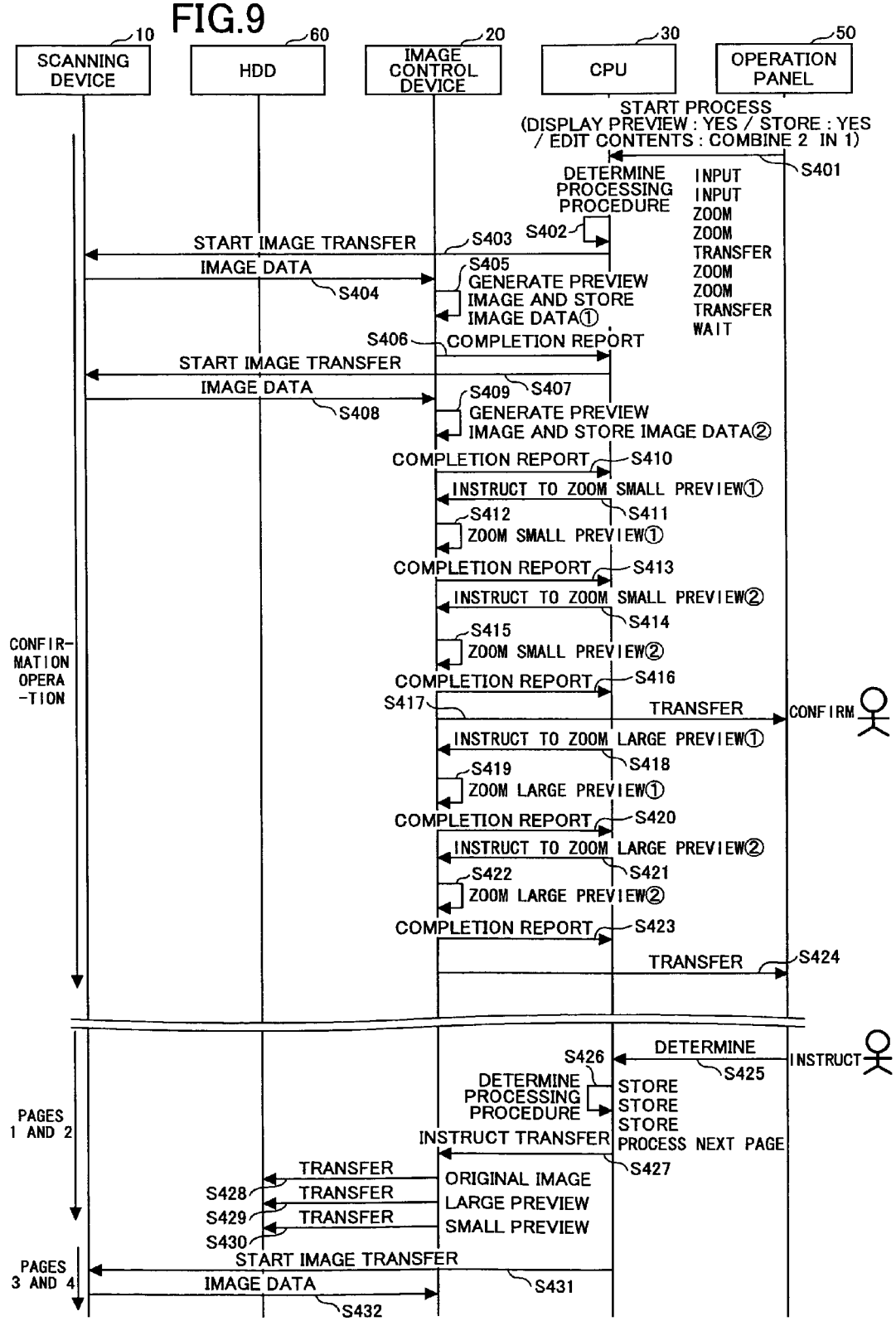
FIG. 9 is a sequence diagram for describing a process of scanning an image from the top and combining images.
Figure 10:
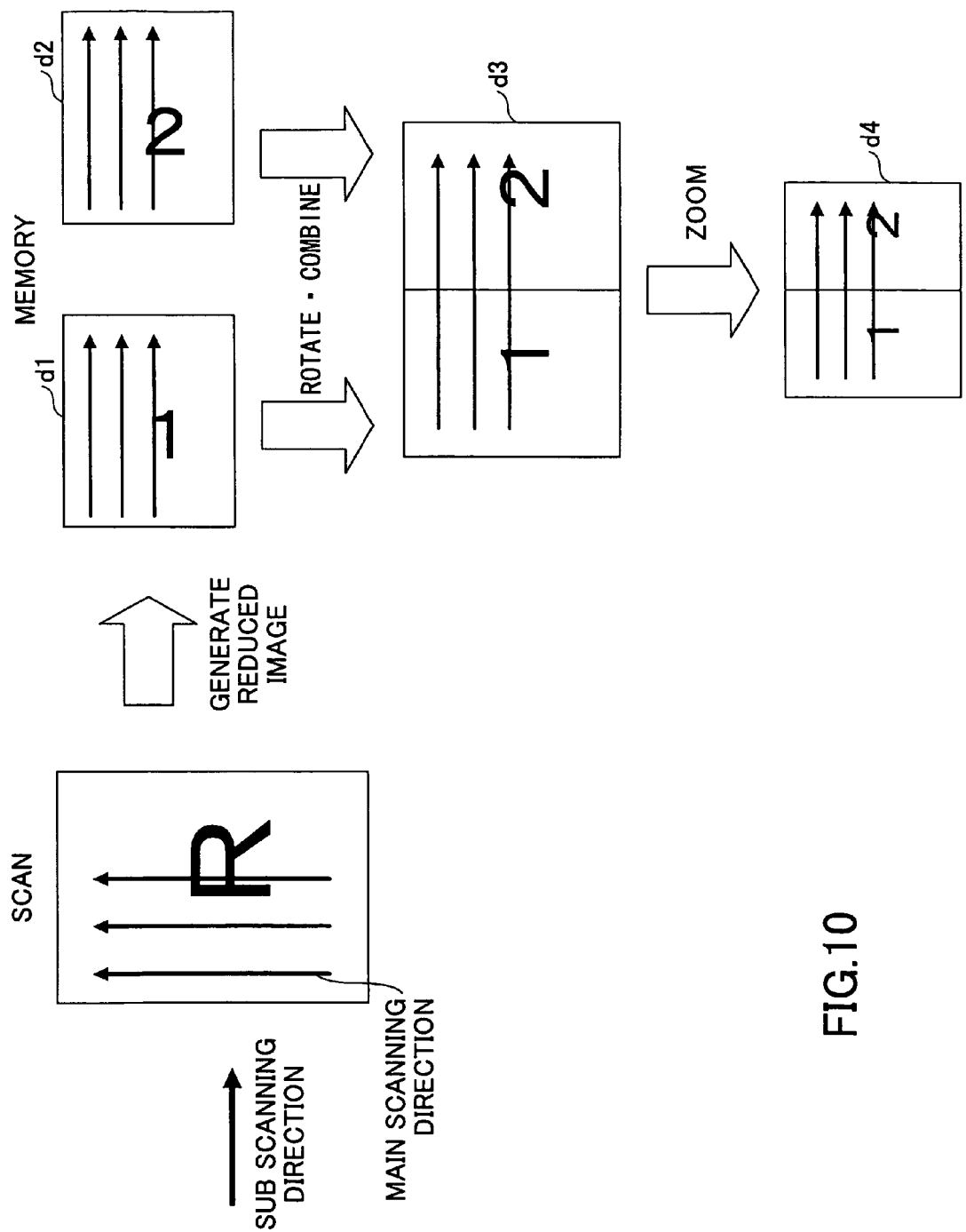
FIG. 10 illustrates an example of scanning an image in a direction other than from the upper side of the image and combining images.
Figure 11:
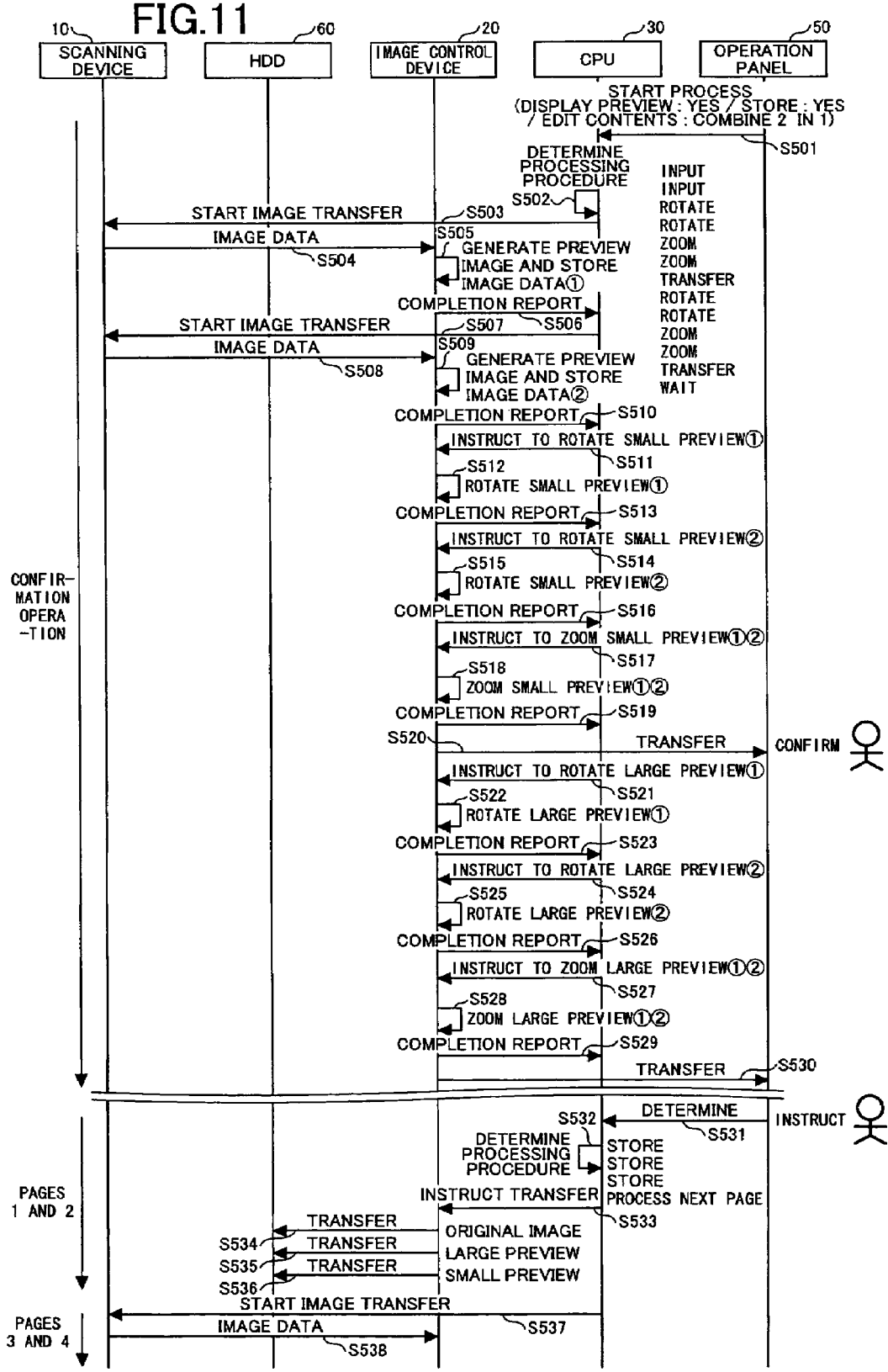
FIG. 11 is a sequence diagram for describing a process of scanning an image in a direction other than from the upper side of the image and combining images.

FIGS. 8 through 11 illustrate examples of combining images. FIGS. 8 and 9 illustrate an example of combining image data obtained by scanning each image from the upper side. FIGS. 10 and 11 illustrate an example of combining image data obtained by scanning each image in a direction other than from the upper side of the image. The circled numbers in the flowcharts represent the order of the scanned original (e.g., first page, second page) corresponding to the image data.

In FIG. 8, a reduced image is generated from the original image data obtained by scanning an image from the upper side. In this example, a "2 in 1" process is performed for combining two images into one page. Therefore, a reduced image c1 and a reduced image c2 are generated from different original image data items. The reduced image c1 and the reduced image c2 are stored in the memory 40 in such a manner that the pixels are arranged starting from the top left toward the right, as viewed with the upper side of the image situated at the top of the view.

When generating a combined preview image from the reduced image c1 and the reduced image c2, a zooming process is performed to further reduce the reduced image c1 and the reduced image c2. The image control device 20 controls the addresses in the memory 40 for saving the resultant image data obtained from the zooming process, to arrange the pixels such that the image data obtained from the reduced image c1 and the image data obtained from the reduced image c2 are joined together side by side, as in an image c3. By performing DMA transfer for the zooming process, the preview image c3 is generated, in which the two reduced images are combined.

FIG. 9 is a sequence diagram of the process described in FIG. 8. At step S401 of FIG. 9, the operation panel 50 outputs, to the CPU 30, a request to start the process. This request includes the contents of the process. The contents of the process are, for example, to scan the image from the upper side, display a preview, store the image data in the HDD 60, perform a combining process, etc.

Step S402 is performed after step S401. The CPU 30 determines the processing procedures based on the process contents. In this example, it is determined that the processes are to be executed in the order of inputting the image and generating the preview images for two images one after the other, generating a small preview and subjecting it to a zooming process, transferring the small preview to the operation panel 50, generating a large preview and subjecting it to a zooming process, and transferring the large preview to the operation panel 50.

The processes of steps S403 through S410 performed after step S402 are for giving an instruction to transfer the original image data and generating a reduced image based on the instruction. Steps S403 through S406 are processes for the first image, and steps S407 through S410 are processes for the second image. The reduced images generated at these steps are to be used for generating a "preview image" incorporating the modifying processes such as a combining process. In the following description, as a matter of simplification, these reduced images are referred to as "small preview" and "large preview", similar to the description of FIG. 5, etc. These processes are the same as those of steps S103 through S106 of FIG. 5, and are thus not further described.

Step S411 is performed after step S410. The CPU 30 outputs, to the image control device 20, an instruction to perform a zooming process on the small preview of the first image. Step S412 is performed after step S411. The image control device 20 reads the small preview of the first image from the memory 40, performs a zooming process on this small preview, and stores the reduced small preview in another region of the memory 40.

The image control device 20 controls the address in the memory 40, so that the reduced small preview of the first image and a reduced small preview of the second image which is to be obtained in subsequent processes are arranged as shown in the image c3 in FIG. 8. More specifically, when the reduced small previews are to be joined together side by side as shown in the image c3 in FIG. 8, the one-dimensional memory address of each reduced small preview preferably includes spaces between each of the lines in the main scanning direction, where each space corresponds to one line. When the reduced small previews are to be combined in such a manner as to be joined vertically (one on top of the other), the memory address of the small preview of the first image is to be followed by that of the small preview of the second image.

Step S413 is performed after step S412. The image control device 20 outputs, to the CPU 30, a notice reporting that the zooming process has ended.

The processes of steps S414 through S416 performed after step S413 pertain to the small preview of the second image, and the difference between the processes of steps S411 through S413 pertaining to the small preview of the first image is that the address for storing the small preview obtained by the zooming process at step S415 is determined so as to satisfy a predetermined relationship with the small preview of the first image obtained by the zooming process at step S412.

More specifically, when the images are combined by being joined together side by side as shown in the image c3 of FIG. 8, the pixels of the first line in the small preview of the first image are followed by the pixels of the first line in the small preview of the second image, and likewise for the second line and beyond. When the images are combined by being joined together vertically (one on top of the other), the small preview of the first image is immediately followed by the small preview of the second image.

Step S417 is performed after step S416. The image control device 20 transfers, to the operation panel 50, the final preview image in which the images are combined, and the operation panel 50 displays this preview image.

The processes of steps S418 through S424 performed after step S417 pertain to the large preview, which are the same as the processes of steps S411 through S416 pertaining to the small preview and thus not further described.

According to the above processes, the preview image in which the small previews with low resolution are combined is first displayed on the operation panel 50, and then the preview image in which the large previews with high resolution are combined is displayed on the operation panel 50. Accordingly, it is possible to reduce the time required to display the first preview image for the operator. Furthermore, by displaying both the small preview and the large preview, preferable preview images can be provided according to the operator's purpose of viewing the preview.

The processes of steps S425 through S430 performed after step S424 are for storing, in the HDD 60, the original image data, the large preview, and the small preview for the first and second images, which can be easily anticipated from the processes of steps S109 through S114 of FIG. 5 and thus not further described.

(Example of Scanning Image in Direction Other than from Upper Side and Combining Images)

FIGS. 10 and 11 illustrate an example of combining image data obtained by scanning each image in a direction other than from the upper side of the image. In FIG. 10, a reduced image is generated from the original image data obtained by scanning an image in a direction other than from the upper side of the image. In this example, a "2 in 1" process is performed for combining two images into one page. Therefore, a reduced image d1 and a reduced image d2 are generated from different original image data items.

In the reduced image, the pixels are arranged in such a manner that the upper side of the image is not situated at the top when displayed on the display unit. Thus, a rotating process is performed to change the order in which the pixels are arranged. By controlling the address in the memory 40 for writing in the image data obtained as a result of performing the rotating process, the pixels can be arranged in such a manner that the image data corresponding to the reduced image d1 and the image data corresponding to the reduced image d2 are joined together side by side as shown in an image d3. By performing this DMA transfer, the image d3 in which the images are combined is generated. Furthermore, by performing a zooming process on the image d3, a preview image d4 is generated.

As shown in FIG. 10, the rotating process and the combining process are performed by DMA transfer, and subsequently, the zooming process is performed. Therefore, memory access can be efficiently performed. More specifically, the pixels arranged one-dimensionally are collectively read from and written in the memory 40. Therefore, by combining the images first as described with reference to FIG. 10, more pixels can be continuously read in the zooming process, and therefore memory access can be efficiently performed.

FIG. 11 is a sequence diagram of the process described in FIG. 10. At step S501 of FIG. 11, the operation panel 50 outputs, to the CPU 30, a request to start the process. This request includes the contents of the process. The contents of the process are, for example, to scan the image in a direction other than from the upper side of the image, display a preview, store the image data in the HDD 60, perform a combining process, etc.

Step S502 is performed after step S501. The CPU 30 determines the processing procedures based on the process contents. In this example, it is determined that the processes are to be executed in the order of inputting the image and generating the preview image for two images one after the other, generating a small preview for each of the two images and rotating the small preview, joining the two small previews to obtain an image, performing a zooming process on the obtained image, transferring this image to the operation panel 50, and also performing the same processes as those performed for the small previews for the large previews.

The processes of steps S503 through S510 performed after step S502 are the same as the processes of steps S403 through S410 of FIG. 9, and are thus not further described.

Step S511 is performed after step S510. The CPU 30 outputs, to the image control device 20, an instruction to rotate the small preview of the first image. Step S512 is performed after step S511. The image control device 20 reads the small preview from the memory 40, and performs a rotating process on the small preview by DMA transfer, which is done by controlling the address so that the small preview is written into another region of the memory 40.

When the small preview of the first image and the small preview of the second image are combined by being joined together side by side as shown in the image d3 in FIG. 10, the address for writing the small preview of the first image in the memory 40 is to have the following configuration. That is, the address preferably includes a space between each line in the main scanning direction, so that each space can be used for the data of the small preview of the second image. Furthermore, when the small preview of the first image and the small preview of the second image are combined by being joined together vertically (one on top of the other), the memory address of the small preview of the first image is to be followed by that of the small preview of the second image.

Step S513 is performed after step S512. The image control device 20 outputs, to the CPU 30, a notice reporting that the rotating process has ended.

The processes of steps S514 through S516 performed after step S513 pertain to the small preview of the second image, and the difference between the processes of steps S511 through S513 pertaining to the small preview of the first image is that the address for storing the small preview obtained by the rotating process at step S515 is determined so as to satisfy a predetermined relationship with the small preview of the first image obtained by the rotating process at step S512.

More specifically, when the images are combined by being joined together side by side as shown in the image d3 of FIG. 10, the pixels of the first line in the small preview of the first image are followed by the pixels of the first line in the small preview of the second image, and likewise for the second line and beyond. When the images are combined by being joined together vertically (one on top of the other), the small preview of the first image is immediately followed by the small preview of the second image.

Step S517 is performed after step S516. The CPU 30 outputs, to the image control device 20, an instruction to perform a zooming process to reduce the small preview in which the two images are joined. Step S518 is performed after step S517. The image control device 20 reads, from the memory 40, the small preview in which the two images are joined, performs a zooming process on this small preview, and writes the reduced small preview in the memory 40. Step S519 is performed after step S518. The image control device 20 outputs, to the CPU 30, a notice reporting that the zooming process has ended. Accordingly, a preview image in which the two images are joined is generated, as in an image d4 of FIG. 10.

Step S520 is performed after step S519. The image control device 20 transfers, to the operation panel 50, the preview image in which the images are combined, and the operation panel 50 displays this preview image.

The processes of steps S521 through S530 performed after step S520 pertain to the large preview, which are the same as the processes of steps S511 through S520 pertaining to the small preview and thus not further described.

The processes of steps S531 through S538 performed after step S530 are the same as the processes of steps S425 through S432 of FIG. 9 and thus not further described.

(Description of Process for Generating Reduced Image)

Figure 12:
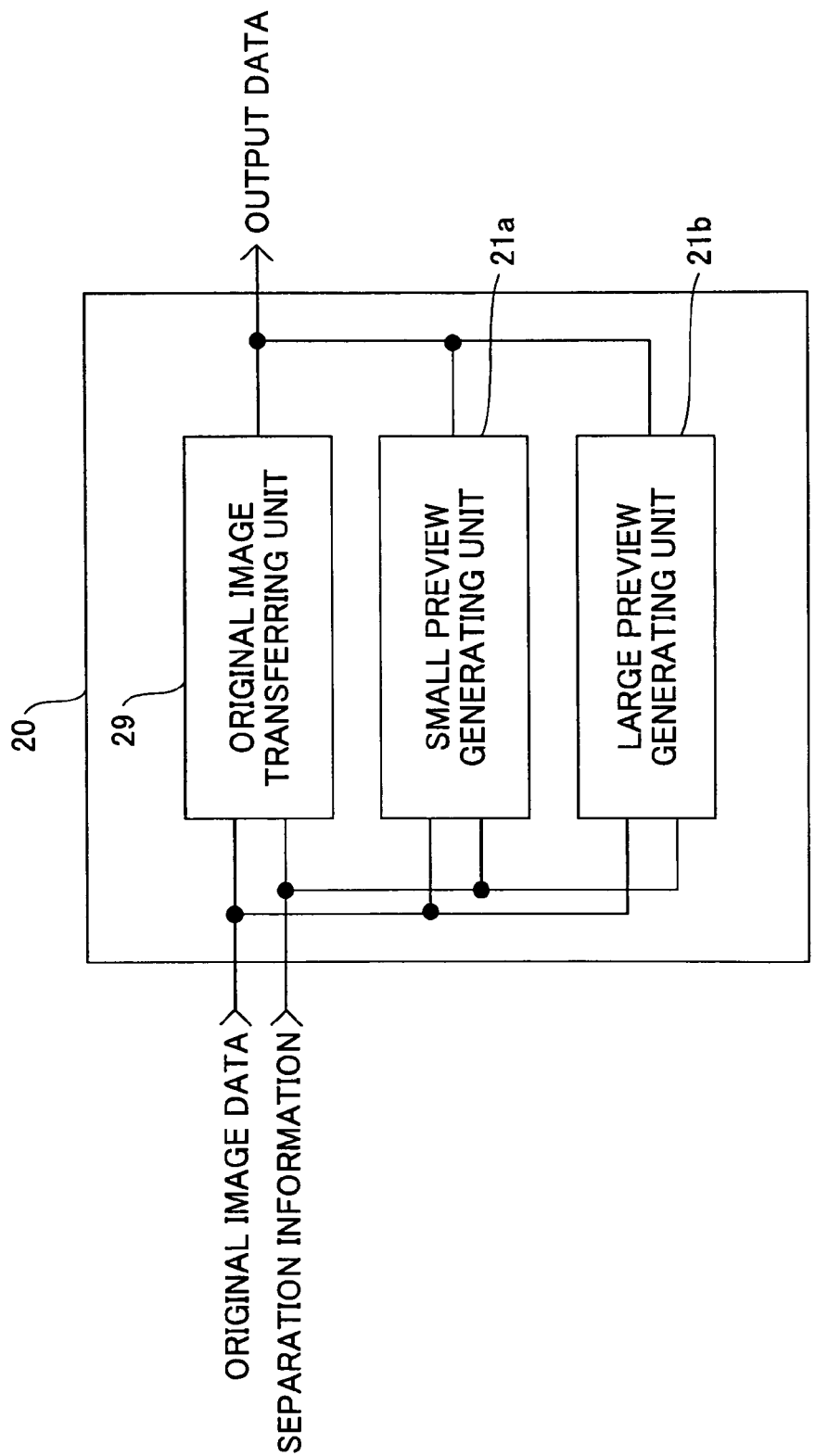
FIG. 12 illustrates an image control device for generating reduced images.

FIGS. 12 through 15 are for describing the process for generating a reduced image. FIG. 12 illustrates an example of the configuration of the image control device 20. Among the units shown in FIG. 4, the portions pertaining to the zooming process are illustrated in more detail. The image control device 20 shown in FIG. 12 includes, for example, an original image transfer unit 29, a small preview generating unit 21a, and a large preview generating unit 21b.

The original image transfer unit 29 is a DMA controller for receiving input of original image data and transferring and outputting this original image data. The small preview generating unit 21a and the large preview generating unit 21b generate and output reduced images having different resolution levels. Furthermore, in the example shown in FIG. 12, there are two reduction zooming units. However, there can be more than two reduction zooming units provided one for each resolution level of the reduced image, or there can be provided a single reduction zooming unit to generate reduced images of different resolution levels. Accordingly, plural reduced images of different resolution levels can be generated.

The small preview generating unit 21a and the large preview generating unit 21b generate reduced images of the input original image data, by applying the reducing method in accordance with attributes of each region in the image, with reference to input separation information. The separation information includes information for identifying the regions in the image, and information indicating the attributes of each region. Attributes of each region are, for example, information indicating whether the region is a "character region" or a "non-character region", or information indicating whether the region is a "chromatic region" or a monochrome region, i.e., an "achromatic region".

The following is the reason why different reducing methods are performed depending on attributes of each region. That is, when generating a preview image and a thumbnail image, if the same reduction zooming method is performed for the entire original image data, there may be failures in the character region or the image region. For example, if a reduction zooming method suitable for the character region is performed for the entire original image data, the image of the image region may appear grainy. On the other hand, if a reduction zooming method suitable for the image region is performed for the entire original image data, the characters may be blotched. Furthermore, if a process for each color component of RGB is performed on a color image, the color balance may deteriorate.

By changing the zooming method according to the attributes of the regions so that a method suitable for each region can be applied, preview images and thumbnail images with higher image quality can be generated.

(Configuration of Reduction Zooming Unit Having Plural Zooming Parts)

Figure 13:
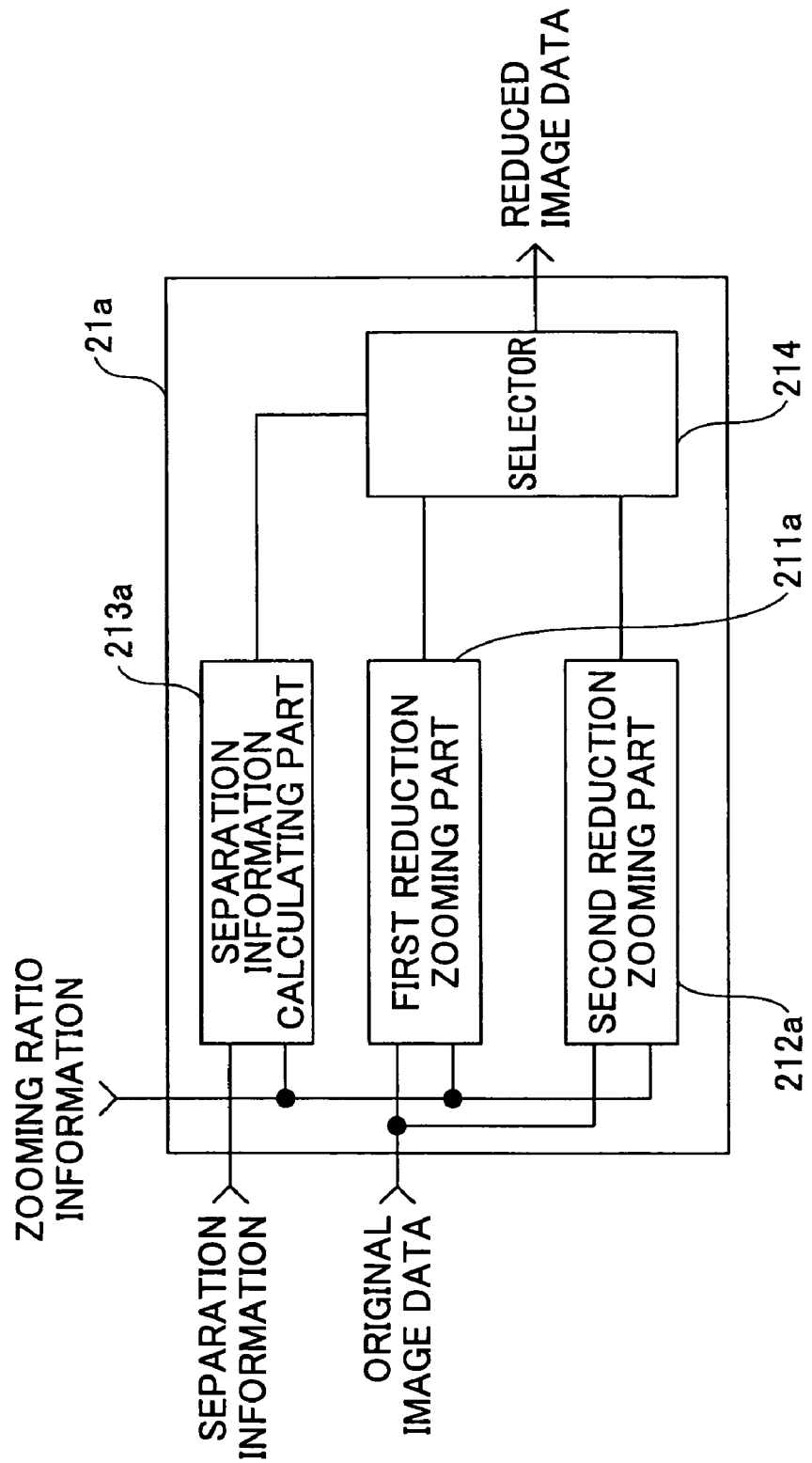
FIG. 13 illustrates the configuration of a reduction zooming unit including plural zooming parts.

FIG. 13 illustrates the configuration of the reduction zooming unit shown in FIG. 12. The small preview generating unit 21a includes a separation information calculating part 213a, a first reduction zooming part 211a, a second reduction zooming part 212a, and a selector 214.

The separation information calculating part 213a analyzes the separation information that is input in association with the original image data, and acquires attributes of the region to which the pixels belong. The separation information is, for example, one bit corresponding to each pixel, where the value is "1" in the case of a character region and "0" in the case of a non-character region. In another example of the separation information, the value is "1" in the case of an achromatic region and "0" in the case of a chromatic region.

The separation information output from the separation information calculating part 213a may have a value corresponding to each pixel in the reduced image that is output. For example, to determine whether a region is a character region, the number of character information values is counted based on the zooming ratio. When the image is reduced to one-fourth, and the counted number of character information values is, for example, two or more in a region of 4×4, it is determined that this region is a character region. To determine whether a region is a chromatic region, the number of chromatic region values is counted based on the zooming ratio. When the image is reduced to one-fourth, and the counted number of chromatic information values is, for example, four or more in a region of 4×4, it is determined that this region is a chromatic region.

The first reduction zooming part 211a and the second reduction zooming part 212a use different reduction zooming methods to reduce the input original image data based on an input zooming ratio, and generate a reduced image. Based on the separation information output from the separation information calculating part 213a, the selector 214 selects either one of the pixels output from the first reduction zooming part 211a or the second reduction zooming part 212a.

(Example of Configuration of Reduction Zooming Part)

Figure 14:
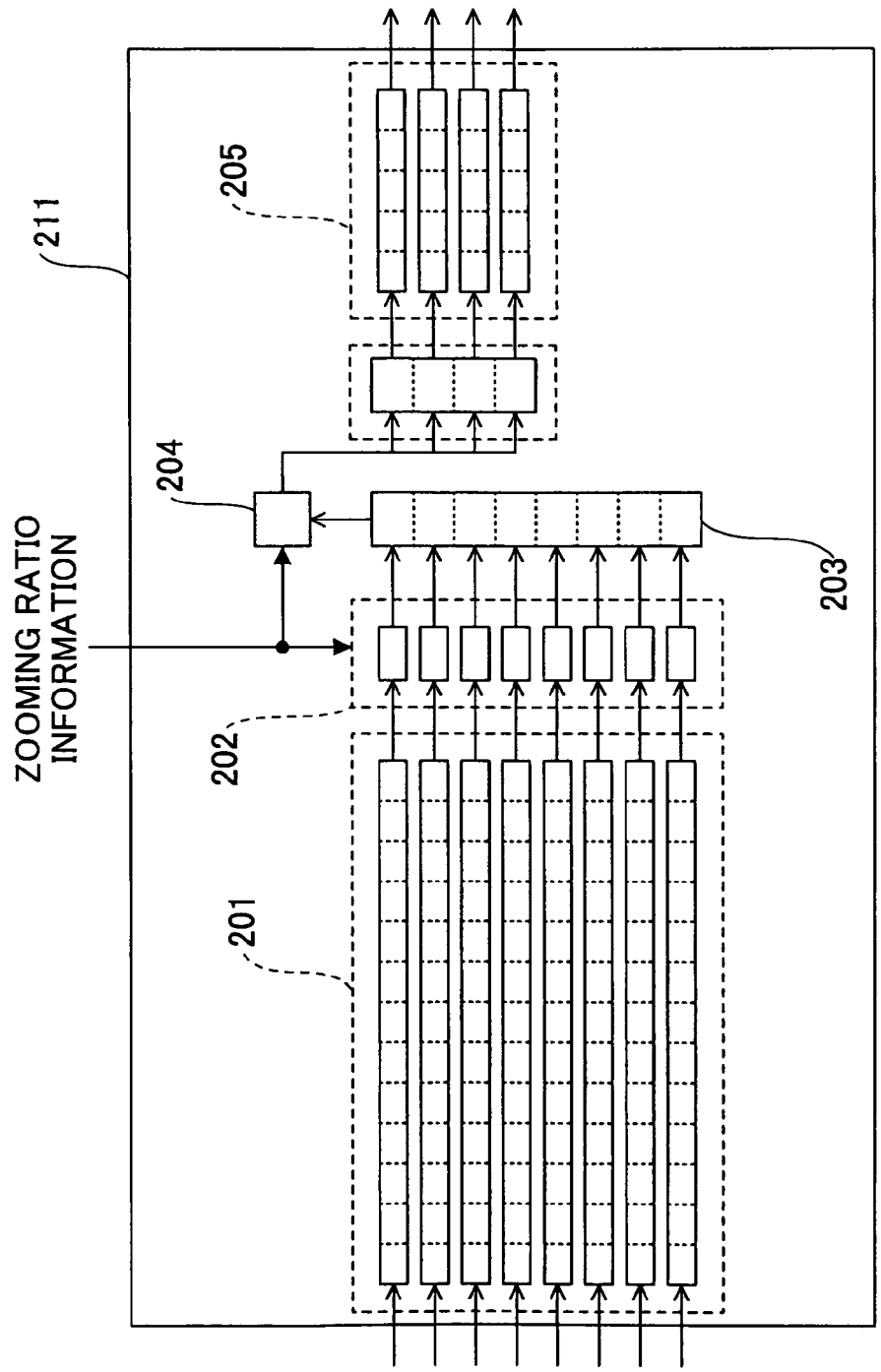
FIG. 14 illustrates an example of the reduction zooming part.

FIG. 14 illustrates an example of the reduction zooming part. The zooming part 211 shown in FIG. 14 includes a line buffer 201, a calculator 202, a buffer 203, a calculator 204, and an output buffer 205.

The line buffer 201 stores data for each line in the main scanning direction. The calculator 202 performs a zooming process on the pixel data of each line based on the input zooming ratio information. For example, to generate a reduced image having half the length and width of the original image data, one reduced pixel data item is generated from two pixel data items. To generate a reduced image having one quarter of the length and width of the original image data, one reduced pixel data item is generated from four pixel data items.

The buffer 203 stores the reduced pixel data generated by the calculator 204. The calculator 204 generates pixel data of the reduced image from reduced pixel data corresponding to plural lines. For example, to generate a reduced image having half the length and width of the original image data, pixel data for one reduced image is generated from the reduced pixel data corresponding to two lines. To generate a reduced image having one quarter of the length and width of the original image data, pixel data for one reduced image is generated from the reduced pixel data corresponding to four lines.

The output buffer 205 stores pixel data of the reduced image generated by the calculator 204. In the example of FIG. 14, the output buffer 205 is configured to store pixels corresponding to four lines, and the line buffer 201 is configured to store pixels corresponding to eight lines. Thus, to generate a reduced image having half the length and width of the original image data, output from all of the lines of the output buffer 205 is acquired as data of the reduced image. To generate a reduced image having one quarter of the length and width of the original image data, output from two of the lines of the output buffer 205 is acquired as data of the reduced image. Furthermore, to generate a reduced image having one eighth of the length and width of the original image data, output from one of the lines of the output buffer 205 is acquired as data of the reduced image.

(Configuration of Calculator Corresponding to Region Attributes)

Details of processes performed by the calculator 202 and the calculator 204 are described below. To generate a reduced image, for example, there are two filter processes as follows.
(1) OR interleaving method . . . A method of selecting one pixel from plural pixels according to a condition, and specifying the value of the selected pixel as the value of the pixel after reduction. There is a method of selecting the pixel with the maximum value, and a method of selecting the pixel with the minimum value.
(2) Averaging method . . . A method of calculating the average value of plural pixels, and specifying the average value of the pixel after reduction.

In the present embodiment, the OR interleaving method is applied as the reducing process performed on the character region, and the averaging method is applied as the reducing process performed on the non-character region. Thus, in the character region, the characters can be prevented from being blotched or blurred, and in the non-character region, well-balanced images can be formed.

More specifically, for example, in the first reduction zooming part 211a, the calculator 202 and the calculator 204 are OR calculators, and in the second reduction zooming part 212a, the calculator 202 and the calculator 204 are averaging calculators. The selector 214 selects the output of the first reduction zooming part 211a for the pixels in the character region, and selects the output of the second reduction zooming part 212a for the pixels in the non-character region.

Furthermore, in the present embodiment, the OR interleaving method and the averaging method are applied for the main scanning direction and the sub scanning direction, respectively, as the reducing process performed on the chromatic region. The averaging method is applied as the reducing method performed on the achromatic region. Accordingly, a reduced image can be formed with well-balanced colors and smooth properties in the chromatic region.

More specifically, for example, in the first reduction zooming part 211a, the calculator 202 is an OR calculator and the calculator 204 is an averaging calculator. In the second reduction zooming part 212a, the calculator 202 and the calculator 204 are averaging calculators. The selector 214 selects the output of the first reduction zooming part 211a for the pixel in the chromatic region, and selects the output of the second reduction zooming part 212a for the pixel in the achromatic region. In the first reduction zooming part 211a corresponding to the chromatic region, the calculator 202 can be the averaging calculator and the calculator 204 can be the OR calculator.

(Flow of Zooming Process)

Figure 15:
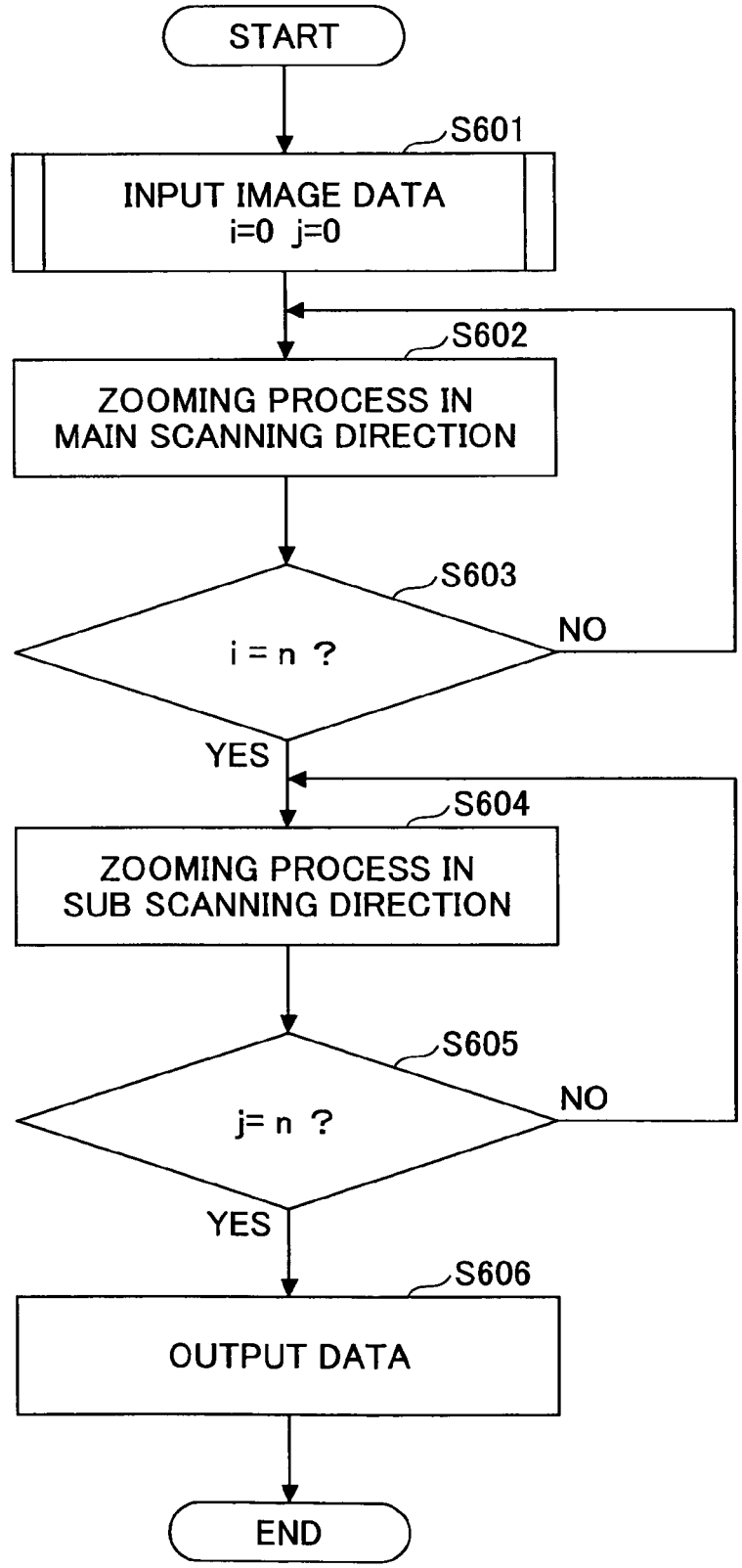
FIG. 15 is a flowchart for describing an example of the process of the reduction zooming part.

FIG. 15 is a flowchart for describing an example of the process of the reduction zooming part shown in FIG. 14. In FIG. 15, at step S601, the original image data starts to be input into the line buffer 201. In this step, a counter i for the main scanning direction and a counter j for the sub scanning direction are initialized to indicate zero. After step S601, the process proceeds to step S602, where a zooming process is performed once in the main scanning direction and the counter i is incremented by one. After step S602, the process proceeds to step S603, where the reduction zooming part determines whether the value of the counter i is equal to a zooming ratio n. The zooming ratio n is the inverse number of the reduction ratio. For example, when the image is to be reduced to one-quarter, the zooming ratio n is four. If the value of the counter i is equal to the zooming ratio n, the process proceeds to step S604, and if not, step S602 is repeated.

After step S603, the process proceeds to step S604, where a zooming process is performed once in the sub scanning direction and the counter j is incremented by one. After step S604, the process proceeds to step S605, where the reduction zooming part determines whether the value of the counter j is equal to the zooming ratio n. If the value of the counter j is equal to the zooming ratio n, the process proceeds to step S605, and if not, step S604 is repeated. After step S605, the process proceeds to step S606, where one pixel data item of the reduced image is output.

The above process is repeated until all of the pixels for the reduced image are generated, thereby generating the reduced image.

(Example of Configuration of Image Forming Apparatus)

Figure 16:
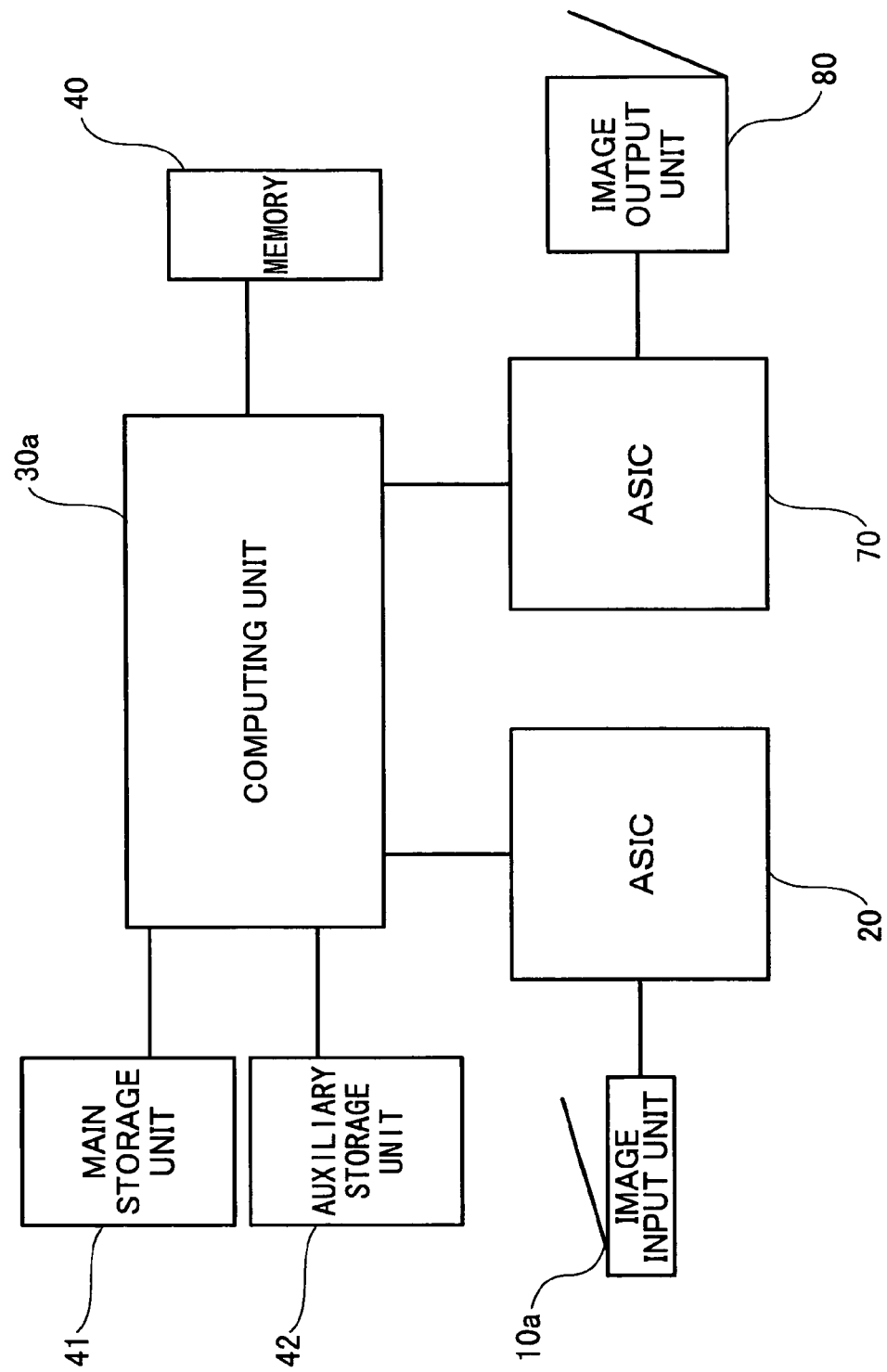
FIG. 16 illustrates an example of a configuration of an image forming apparatus.

FIG. 16 illustrates an example of a configuration of an image forming apparatus including the image control device of the image processing device according to the present embodiment. The image forming apparatus shown in FIG. 16 includes an image input unit 10a, the image control device 20, a computing unit 30a, the memory 40, a main storage unit 41, an auxiliary storage unit 42, an image control device 70, and an image output unit 80.

The image input unit 10a is, for example, a scanner. The image control device 20 performs an image conversion process or an image reducing process on the image data input from the image input unit 10a. The image control device 20 can be implemented as an ASIC including a unit for realizing these image processing functions, an arbiter, and a DMA controller.

The computing unit 30a includes, for example, a CPU and a PCI controller, and controls all units of the image forming apparatus. The memory 40 stores image data to be processed. The main storage unit 41 is, for example, a RAM, and the auxiliary storage unit 42 is a storage unit such as a HDD.

The image processing device 70 processes image data to be output to the image output unit 80. The image processing device 70 can be implemented as an ASIC including a unit for realizing image processing functions, an arbiter, and a DMA controller. The image output unit 80 is implemented as a plotter, for example.

(Configuration of Computer)

Figure 17:
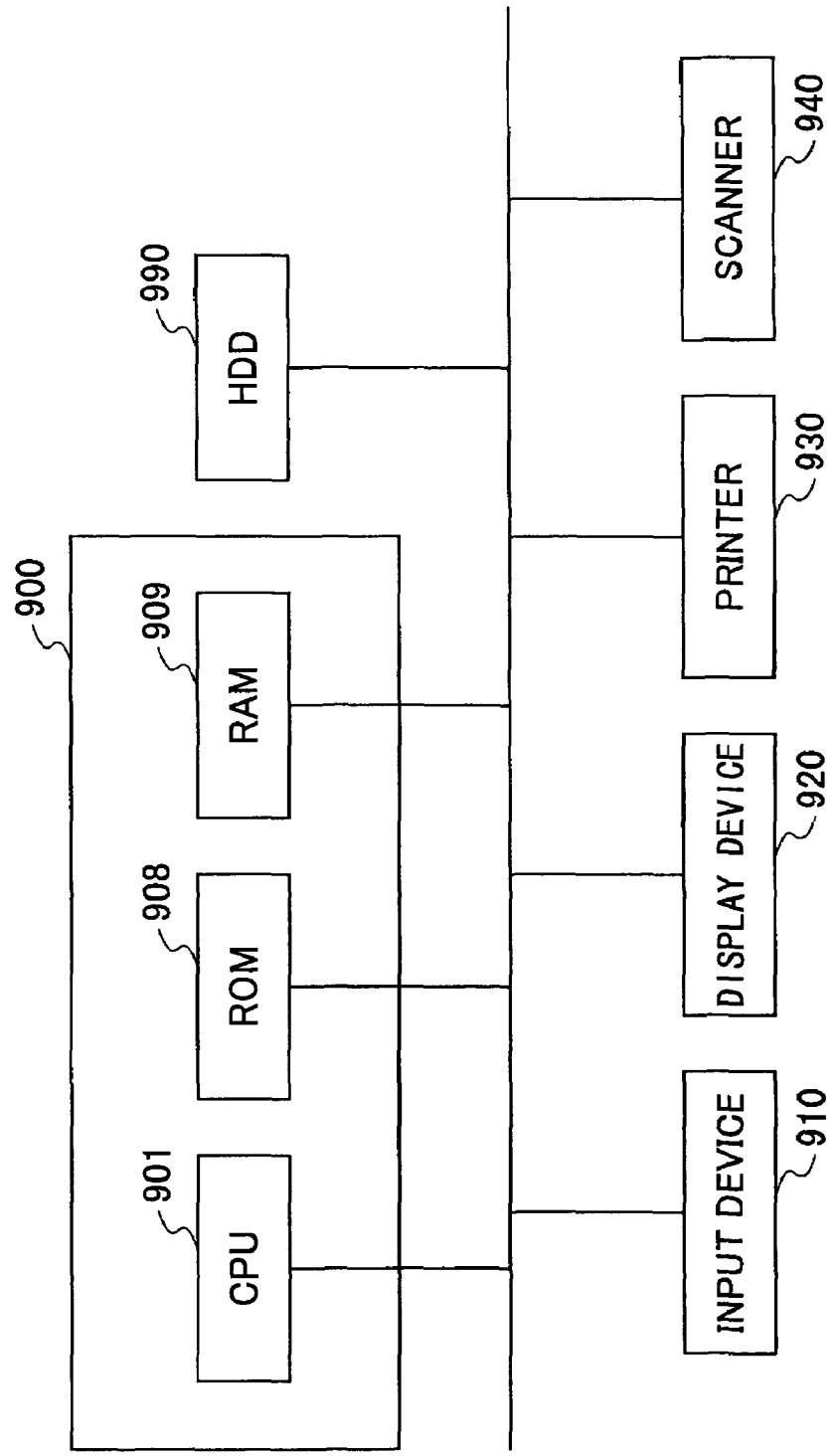
FIG. 17 illustrates a configuration of a computer for realizing the image processing device according to an embodiment of the present invention.

FIG. 17 illustrates a configuration of a computer for realizing the image processing device according to the present embodiment. The computer shown in FIG. 17 includes a main processing unit 900, an input device 910, a display device 920, a printer 930, a scanner 940, and a HDD 990. The main processing unit 900 is the main part for realizing functions of the computer, and includes a CPU 901, a ROM 908, and a RAM 909. The CPU 901 reads a computer program from the ROM 908 and loads it in the RAM 909, thereby executing the computer program according to the present embodiment. The ROM 908 is a nonvolatile memory, which holds a program such as a computer program to be executed by the CPU 901, and parameters necessary for controlling the image processing device. The RAM 909 is a work memory used by the CPU 901 to perform processes.

The input device 910 is, for example, a keyboard, which is used by the operator to input instructions. The display device 920 displays the state of the computer, for example. The printer 930 is a device for forming an image on a medium and outputting the medium with the image. The scanner 940 is a device for optically scanning an image formed on a medium. The HDD 990 stores large volume data such as image data.

The computer program according to the present embodiment is stored in the HDD 990 or the ROM 908, and can also be stored in a recording medium that can be inserted into a drive device (not shown).

(Example of Image Processed by Present Embodiment)

Figure 18C:
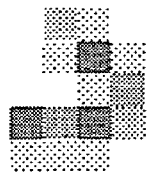
FIGS. 18A through 18C illustrate examples of images that are processed according to an embodiment of the present invention.
Figure 18B:
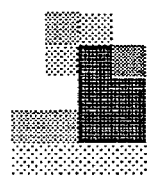
Figure 18A:
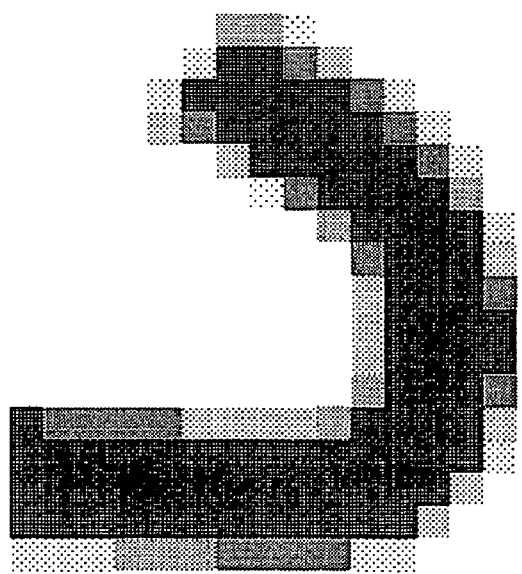

FIGS. 18A through 18C illustrate examples of images that are processed according to the present embodiment. The images in FIGS. 18A through 18C appear to be achromatic; however, these images are assumed to be chromatic.

FIG. 18A is an image based on original image data, and FIGS. 18B and 18C are images based on reduced image data. The image in FIG. 18B has undergone a reducing process performed with the averaging method. The image in FIG. 18C has undergone a reducing process performed by applying the OR interleaving method for the main scanning direction and by applying the averaging method in the sub scanning direction. The curve in the image shown in FIG. 18C is formed with higher precision than that in FIG. 18B.

(Example of Performing Different Interleaving Process according to Brightness Components and Color-Difference Components of Image Data)

FIG. 19 illustrates an image processing device configured to perform a different interleaving process for the brightness components and the color-difference components of image data. An image processing device 1000 shown in FIG. 19 performs an interleaving process on the color original image data that has been input, and outputs a preview image. The image processing device 1000 includes an RGB→YUV conversion unit 1100, an averaging/OR interleaving unit 1210, a simple interleaving unit 1220, a zooming ratio setting unit 1230, and a YUV→RGB conversion unit 1300.

The RGB→YUV conversion unit 1100 converts the original image data from the RGB format into the YUV format including brightness components and color-difference components. The conversion of RGB→YUV is performed with the use of the following formula (1), for example.

$$\left.\begin{array}{l} Y = \frac{1}{4}(R + 2G + B) \\ U = R - G \\ V = B - G \end{array}\right\} \quad (1)$$

Among the components of the image data output from the RGB→YUV conversion unit 1100, the brightness components are input into the averaging/OR interleaving unit 1210 and the color-difference components are input into the simple interleaving unit 1220.

The averaging/OR interleaving unit 1210 performs an interleaving process with the averaging method or the OR interleaving method on the input brightness components, and outputs the reduced image data. The averaging/OR interleaving unit 1210 has the same configuration as the small preview generating unit 21a shown in FIG. 13, for example.

The simple interleaving unit 1220 performs a simple interleaving process of interleaving pixels at predetermined intervals, on the input color-difference components. When the simple interleaving process is performed, information associated with lines and pixels that are not included in the output image data will be missing. Thus, when lines and pixels corresponding to important information are not selected, the image quality may decline considerably. Examples of the lines and pixels corresponding to important information are, for example, an arrangement of pixels corresponding to a thin line having a width of one pixel. When any of these pixels is not selected, the thin line may become defective. However, color-difference components do not have as much an impact on the subjective quality of the image as the brightness components. Therefore, even if important information is missing in the color-different components as a result of performing the simple interleaving process, the impact on the image quality of the generated preview image may be very small.

Furthermore, the device can have a more simple configuration for performing the simple interleaving process, compared to the case of performing the averaging method and the OR interleaving method. Furthermore, when the simple interleaving process is to be implemented with hardware, the circuit scale can be reduced. For example, in a device for implementing the OR interleaving method and the averaging method, the process is performed over plural lines, and therefore a line buffer is required. However, to implement the simple interleaving process, there is no need for a line buffer.

(Diagram Illustrating Averaging Interleaving Process Implemented with Two Line Buffers)

FIG. 20 illustrates the averaging interleaving process for reducing the length and width of the image data to one quarter of the original size, implemented with the use of two line buffers.

In the example of FIG. 20, the sums of every four pixels in the image data in the first line, are input into a line buffer A. The number of values input into the line buffer A is equal to the width of the reduced image data in the main scanning direction. After the process on the first line, the sums of every four pixels in the image data in the second line are added to the value stored in the line buffer A which is equal to the phase of the reduced image data in the main scanning direction, and the value obtained as result of the addition is stored in the line buffer B.

After the process on the second line, the image data of the third line is processed similarly to that of the second line. That is, the sums of every four pixels are added to the value stored in the line buffer B, and the value obtained as result of the addition is stored in the line buffer A. After the process on the third line, the image data of the fourth line is processed similarly to that of the second line. That is, the sums of every four pixels are added to the value stored in the line buffer A. Then, the value obtained as result of the addition is divided by 16. The value obtained as a result of this division corresponds to the pixels after the ¼ interleaving process.

Referring back to FIG. 19, the zooming ratio setting unit 1230 sets a zooming ratio and outputs it to the averaging/OR interleaving unit 1210 and the simple interleaving unit 1220. The averaging/OR interleaving unit 1210 and the simple interleaving unit 1220 perform a zooming process based on the zooming ratio set by the zooming ratio setting unit 1230.

The YUV→RGB conversion unit 1300 converts the image data in the YUV format into the RGB format, which image data includes the brightness components that have undergone the zooming process at the averaging/OR interleaving unit 1210 and the color-difference components that have undergone the zooming process at the simple interleaving unit 1220. Then, a preview image of the converted image data is output.

The preview image obtained by the zooming process performed by the image processing device 1000 can be generated without missing the features of the original image. Furthermore, the configuration of the image processing device 1000 makes it possible to reduce the circuit scale for implementing the interleaving process.

(Example of Process Corresponding to Data Format of Image Data)

Figure 21:
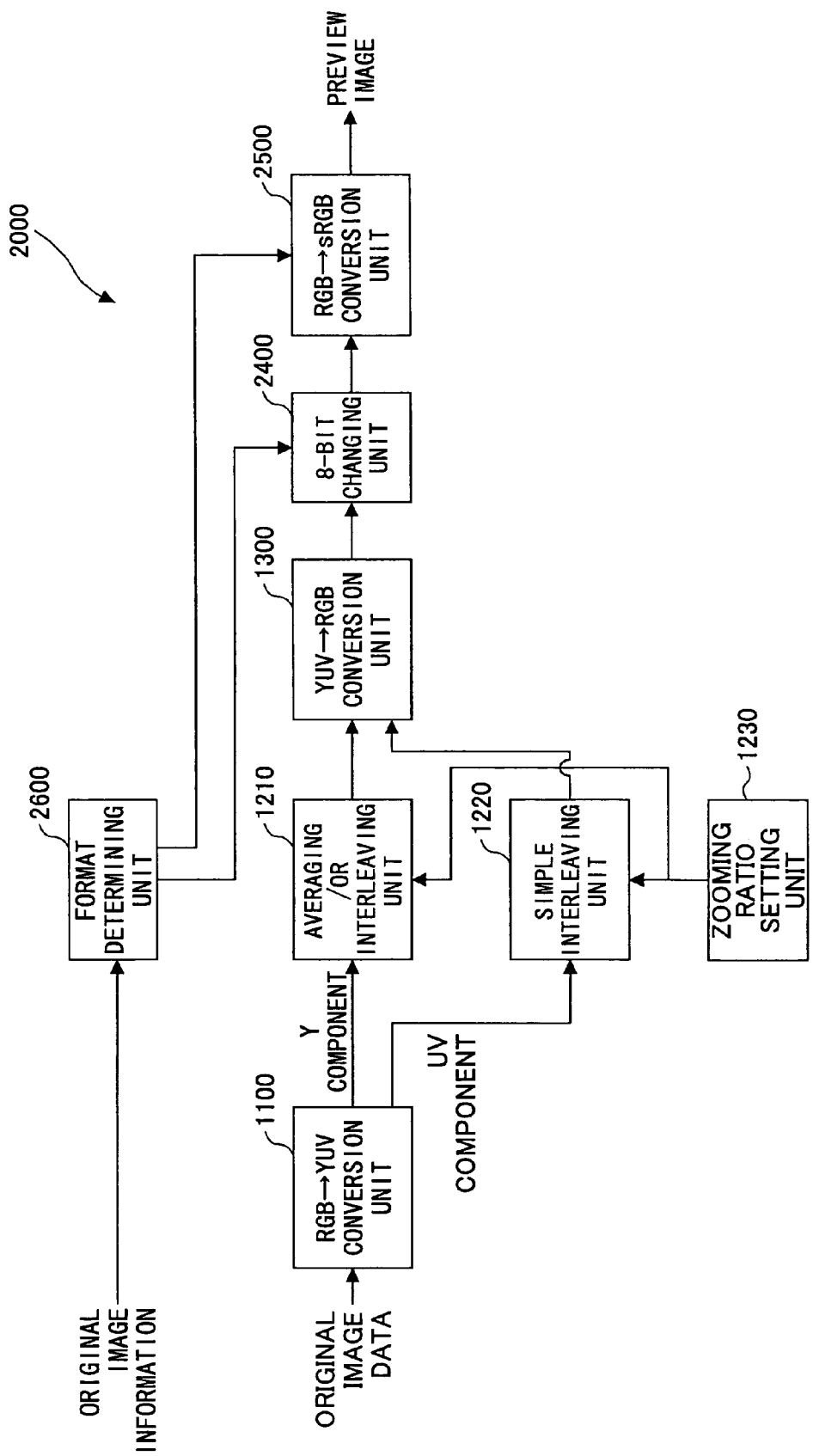
FIG. 21 illustrates an example of an image processing device for implementing a process corresponding to the data format of the image data.

FIG. 21 illustrates an example of an image processing device for implementing a process in accordance with the data format of the image data. An image control device 2000 includes the RGB→YUV conversion unit 1100, the averaging/OR interleaving unit 1210, the simple interleaving unit 1220, the zooming ratio setting unit 1230, the YUV→RGB conversion unit 1300, an 8-bit changing unit 2400, an RGB→sRGB conversion unit 2500, and a format determining unit 2600. In the image control device 2000 in FIG. 21, elements corresponding to those in the image processing device 1000 in FIG. 19 are denoted by the same reference numbers, and are not further described.

The format determining unit 2600 determines the bit depth of the pixel of the original image data that is input. The information indicating the bit depth of a pixel determined by the format determining unit 2600 is output to the 8-bit changing unit 2400. The bit depth of the input image data is, for example, eight bits, four bits, two bits, or one bit for each color component. The format determining unit 2600 further determines whether the input image data is sRGB, and outputs information indicating results of this determination to the RGB→sRGB conversion unit 2500.

When the information of the bit depth of the pixel determined by the format determining unit 2600 indicates that the bit depth of the pixel of the input original image data is not 8 bits, the 8-bit changing unit 2400 changes the bit depth of the pixel of the image data in the RGB format output from the YUV→RGB conversion unit 1300 into 8 bits. Accordingly, the data of the preview image output from the image control device 2000 can be subjected to JPEG compression.

When the format determining unit 2600 determines that the format of the input image data is not in an sRGB format, the RGB→sRGB conversion unit 2500 converts the image data in the RGB format output from the 8-bit changing unit 2400 into an sRGB format.

The present invention is not limited to the specifically disclosed embodiment, and variations and modifications may be made without departing from the scope of the present invention.

The present application is based on Japanese Priority Patent Application No. 2007-327770, filed on Dec. 19, 2007, and Japanese Priority Patent Application No. 2008-027911, filed on Feb. 7, 2008, the entire contents of which are hereby incorporated herein by reference.

What is claimed is:

1. An image processing device comprising:
   a preview image generating unit configured to reduce original image data of an image scanned by a scanning unit to generate a preview image;
   a memory control unit configured to save a preview image data item of the preview image in a memory and read the preview image data item from the memory;
   a transfer unit configured to transfer the preview image data item saved in the memory to a display unit;
   an information input unit configured to input relationship information indicating a relationship between a main scanning direction in which the image is scanned and an upper side of the image; and
   an image rotating unit configured to change, with reference to the relationship information, an arrangement order of pixels in the preview image data item in the event that the main scanning direction and a sub scanning direction in which the scanning unit scans the image do not respectively match the main scanning direction and the sub scanning direction in which the display unit displays the preview image with the upper side at the top of the display unit, whereby the arrangement order of the pixels is changed such that the main scanning direction extends from a left side to a right side of the preview image and the sub scanning direction extends from the upper side to a lower side of the preview image, as viewed with the upper side of the preview image at the top.

2. The image processing device according to claim 1, wherein:
   the preview image generating unit generates plural of the preview images having different resolution levels; and
   the image rotating unit changes the arrangement order of the pixels in each of the preview image data items in an ascending order of the resolution levels of the preview images.

3. The image processing device according to claim 2, wherein:
   the transfer unit transfers the preview image data items to the display unit in an ascending order of the resolution levels of the preview images.

4. The image processing device according to claim 1, wherein:
   in the event that there are plural of the images, the preview image generating unit generates the preview image for each of the images in an order in which the images are input; and
   the image rotating unit executes a process of changing the arrangement order of the pixels in the preview image data item each time the preview image of one of the images is generated.

5. The image processing device according to claim 1, further comprising:
   a storing unit configured to store the preview image data item.

6. The image processing device according to claim 1, wherein:
   the scanning unit generates attribute information indicating an attribute of each region in the image; and
   the preview image generating unit comprises plural zooming units, and generates the preview image by selecting one of the plural zooming units based on the attribute information of each region in the image and activating the selected one of the plural zooming units to reduce the original image data of the image scanned by the scanning unit.

7. The image processing device according to claim 6, wherein:
   the attribute information comprises at least one of character information indicating whether the corresponding region is a character region, and chromatic information indicating whether the corresponding region is a chromatic region or an achromatic region.

8. The image processing device according to claim 7, wherein:
   a first zooming unit among the plural zooming units performs the same zooming process for both the main scanning direction and the sub scanning direction in which the image is scanned by the scanning unit;
   a second zooming unit among the plural zooming units performs different zooming processes for the main scanning direction and the sub scanning direction in which the image is scanned by the scanning unit;
   the preview image generating unit selects and activates the first zooming unit for a region in the image corresponding to the attribute information indicating the achromatic region; and
   the preview image generating unit selects and activates the second zooming unit for a region in the image corresponding to the attribute information indicating the chromatic region.

9. The image processing device according to claim 1, wherein:
   the preview image generating unit comprises a zooming unit configured to process brightness components in the original image data and a zooming unit configured to process color-difference components in the original image data.

10. An image processing method comprising:
    a preview image generating step of reducing original image data of an image scanned by a scanning unit to generate a preview image;
    a saving step of saving a preview image data item of the preview image in a memory;
    a reading step of reading the preview image data item from the memory;
    a transfer step of transferring the preview image data item saved in the memory to a display unit;
    an information input step of inputting relationship information indicating a relationship between a main scanning direction in which the image is scanned and an upper side of the image; and
    an image rotating step of changing, with reference to the relationship information, an arrangement order of pixels in the preview image data item in the event that the main scanning direction and a sub scanning direction in which the scanning unit scans the image do not respectively match the main scanning direction and the sub scanning direction in which the display unit displays the preview image with the upper side at the top of the display unit, whereby the arrangement order of the pixels is changed such that the main scanning direction extends from a left side to a right side of the preview image and the sub scanning direction extends from the upper side to a lower side of the preview image, as viewed with the upper side of the preview image at the top.

11. The image processing method according to claim 10, wherein:
at the preview image generating step, plural of the preview images having different resolution levels are generated; and
at the image rotating step, the arrangement order of the pixels in each of the preview image data items are changed in an ascending order of the resolution levels of the preview images.

12. The image processing method according to claim 11, wherein:
at the transfer step, the preview image data items are transferred to the display unit in an ascending order of the resolution levels of the preview images.

13. The image processing method according to claim 10, wherein:
at the preview image generating step, in the event that there are plural of the images, the preview image for each of the images is generated in an order in which the images are input; and
at the image rotating step, a process of changing the arrangement order of the pixels in the preview image data item is executed each time the preview image of one of the images is generated.

14. The image processing method according to claim 10, further comprising:
a storing step of storing the preview image data item in a storing unit.

15. The image processing method according to claim 10, further comprising:
an attribute information generating step of causing the scanning unit to generate attribute information indicating an attribute of each region in the image, wherein:
at the preview image generating step, the preview image is generated by selecting one of plural zooming units based on the attribute information of each region in the image and activating the selected one of the plural zooming units to reduce the original image data of the image scanned by the scanning unit.

16. The image processing method according to claim 15, wherein:
the attribute information comprises at least one of character information indicating whether the corresponding region is a character region, and chromatic information indicating whether the corresponding region is a chromatic region or an achromatic region.

17. The image processing method according to claim 16, wherein the preview image generating step further comprises:
a step of selecting and activating a first zooming unit among the plural zooming units for a region in the image corresponding to the attribute information indicating the achromatic region, whereby the first zooming unit performs the same zooming process for both the main scanning direction and the sub scanning direction in which the image is scanned by the scanning unit;
and a step of selecting and activating a second zooming unit among the plural zooming units for a region in the image corresponding to the attribute information indicating the chromatic region, whereby the second zooming unit performs different zooming processes for the main scanning direction and the sub scanning direction in which the image is scanned by the scanning unit.

18. The image processing method according to claim 10, wherein the preview image generating step further comprises:
a first zooming step of performing a zooming process corresponding to brightness components in the original image data; and
a second zooming step of performing a zooming process corresponding to color-difference components in the original image data.

19. A non-transitory computer readable storage medium storing computer executable instructions that, when executed by a computer, preform a method according to claim 10.

* * * * *